(12) United States Patent
Tarrant

(10) Patent No.: US 8,055,565 B2
(45) Date of Patent: *Nov. 8, 2011

(54) METHOD AND SYSTEM FOR CREATING AND OPERATING AN INVESTABLE HEDGE FUND INDEX FUND

(75) Inventor: Jeffrey G. Tarrant, New York, NY (US)

(73) Assignee: Tege Software Co., LLC, Wilmington, DE (US)

( * ) Notice: Subject to any disclaimer, the term of this patent is extended or adjusted under 35 U.S.C. 154(b) by 928 days.

This patent is subject to a terminal disclaimer.

(21) Appl. No.: 11/447,756

(22) Filed: Jun. 5, 2006

(65) Prior Publication Data

US 2006/0253363 A1    Nov. 9, 2006

Related U.S. Application Data

(63) Continuation of application No. 10/091,412, filed on Mar. 5, 2002, now Pat. No. 7,085,738.

(51) Int. Cl.
*G06Q 40/00* (2006.01)
(52) U.S. Cl. ........................... 705/36 R; 705/35
(58) Field of Classification Search ............ 705/35, 705/36 R
See application file for complete search history.

(56) References Cited

U.S. PATENT DOCUMENTS

| | | | |
|---|---|---|---|
| 6,829,603 B1 | 12/2004 | Chai et al. | |
| 7,062,459 B1 * | 6/2006 | Herbst et al. | 705/37 |
| 7,366,692 B2 * | 4/2008 | Alcaly et al. | 705/37 |
| 7,469,223 B2 * | 12/2008 | McIntyre et al. | 705/35 |
| 2001/0042037 A1 | 11/2001 | Kam et al. | |
| 2002/0007329 A1 | 1/2002 | Alcaly et al. | |
| 2002/0152151 A1 | 10/2002 | Baughman et al. | |

OTHER PUBLICATIONS

William Fung and David a. Hsieh. "Benchmarks of Hedge Fund Performance: Information Content and Measurement Biases," Feb. 2001.*
"Deutsche Bank Surveys Investors," by Susan Barreto, Senior Reporter. Daily News. White Plains: Dec. 28, 2001.*
"Business Rules and Object Role Modeling," by Terry Halpin. Database Programming & Design, Oct. 1996.*
"Tremont Starts Hedge Fund Index With a Partner," by Sara Calian. Wall Street Journal. (Europe). Brussels: Nov. 17, 1999.*
"MSCI is hoping index family will inspire investors," by Beatrix Payne. Pensions & Investments. Chicago: Aug. 21, 2000, vol. 28, Iss. 17.*

(Continued)

*Primary Examiner* — Jagdish N Patel
*Assistant Examiner* — Sara Chandler
(74) *Attorney, Agent, or Firm* — Turocy & Watson, LLP

(57) ABSTRACT

A preferred embodiment of the present invention includes a method of creating and managing an index fund based on an index of funds of hedge funds, including steps of (a) identifying potential funds for an index of funds of hedge funds; (b) identifying which of the potential funds meet specific criteria selected so as to minimize biases including selection bias and survivorship bias; (c) creating an index by indexing funds identified as meeting the criteria; (d) acquiring a portfolio of funds in the index; and (e) allocating capital to funds in the portfolio.
The invention also includes software to perform the steps of the method described above. In particular, the invention includes software wherein data regarding potential funds is stored in a database according to object role modeling. A preferred database structure is described.

51 Claims, 26 Drawing Sheets

OTHER PUBLICATIONS

Fung, et al. "Performance Characteristics of Hedge Funds and Commodity Funds Natural vs. Spurious Biases". Journal of Financial and Quantitative Analysis, vol. 35, No. 3, Sep. 2000. http://www.edge-fund.com/FuHs00.pdf. Last accessed Nov. 6, 2009, 17 pages.

Asness, et al. 2. "Do Hedge Funds Hedge?" The Journal of Portfolio Management, Fall 2001. http://www.isb.uzh.ch/studium/courses04-05/pdf/0330_2004-11-16_1.pdf. Last accessed Nov. 6, 2009, 14 pages.

Fung, et al. "Empirical Characteristics of Dynamic Trading Strategies—The Case of Hedge Funds" The Review of Financial Studies, vol. 10, No. 2, Summer 1997. http://faculty.fuqua.duke.edu/%7Edah7/rfs1997.pdf. Last accessed Nov. 6, 2009, 28 pages.

Wermers. "Momentum Investment Strategies of Mutual Funds, Performance Persistence, and Survivorship Bias" Working paper, University of Colorado at Boulder, Boulder, CO, Mar. 1997. http://www.rhsmith.umd.edu/faculty/rwermers/essay3c.pdf. Last accessed Nov. 6, 2009, 47 pages.

Agarwal, et al. "Multi-Period Performance Persistence Analysis of Hedge Funds" Mar. 2000. http://www2.gsu.edu/~fncvaa/Jfqapers.pdf. Last accessed Nov. 6, 2009, 29 pages.

Agarwal, et al. "On Taking the 'Alternative' Route—Risks, Rewards and Performance Persistence of Hedge Funds" Nov. 1999. http://www.edge-fund.com/AgNa99.pdf. Last accessed Nov. 6, 2009, 36 pages.

Lo. Risk Management for Hedge Funds—Introduction and Overview. Nov./Dec. 2001. http://www.alphasimplex.com/pdfs/RiskMgmtForHF.pdf. Last accessed Nov. 6, 2009, 18 pages.

Amin et al. Welcome to the Dark Side—Hedge Fund Attrition and Survivorship Bias over the Period 1994-2001 ISMA Center Discussion Papers in Finance 2002. First version: Dec. 11, 2001. http://www.icmacentre.ac.uk/pdf/discussion/DP2002-02.pdf. Last accessed Nov. 6, 2009, 33 pages.

Brown, et al. Offshore Hedge Funds: Survival & Performance 1989-1995. Journal of Business, 1999. http://pages.stern.nyu.edu/~sbrown/pdf/hedges.pdf. Last accessed Nov. 6, 2009, 38 pages.

Goetzmann, et al. Conditions for Survival: Changing Risk and the Performance of Hedge Fund Managers and CTAs. Nov. 15, 1997. http://archive.nyu.edu/bitstream/2451/27233/2/wpa99077.pdf. Last accessed Nov. 6, 2009, 29 pages.

\* cited by examiner

METHOD AND SYSTEM FOR CREATING AND OPERATING AN INVESTABLE HEDGE FUND INDEX FUND

CROSS REFERENCE TO RELATED APPLICATIONS

This application is a continuation application of U.S. patent application Ser. No. 10/091,412, filed Mar. 5, 2002 now U.S. Pat. No. 7,085,738. The entire contents of that application are incorporated herein by reference.

BACKGROUND

A hedge fund may been defined as a pool of private capital used to leverage an investment portfolio structured as a limited partnership. A General Partner (Investment Fund Manager) is expected to have sophisticated portfolio management practices; limited partners (investors) are generally high net-worth individuals and institutions that act as silent partners. Hedge funds often have restricted liquidity, since they cannot be traded in the open market. Moreover, hedge funds are not required to report their assets or returns to the Securities & Exchange Commission (SEC) or to any other entity whose information is made available to the public. And hedge fund advertising is restricted. Thus, unless a hedge fund voluntarily reports its existence and performance to some database, the public may be unable to learn of either.

In recent years the term "hedge fund" has been used broadly to refer to any type of alternative investment strategy ("AIS"). UBS Warburg Global Equity Research defines AIS as "an asset class that seeks to generate absolute positive returns by exploiting market inefficiencies while minimizing exposure and correlation to traditional stock and bond investments." See Alexander M. Ineichen CFA, *In Search of Alpha—Investing in Hedge Funds*, UBS Warburg Global Equity Research, October 2000, page 6 (hereinafter cited as "Alpha"). The term "hedge fund" is used herein, as in the art, interchangeably with the terms alternative investment strategy and AIS.

Investable Index Funds in Traditional Asset Classes

An index fund (also known as a passively-managed fund) seeks to match the investment performance of a specific stock or bond benchmark index. This definition of an index fund can be found, for example, at http://www.vanguard.com, hereinafter referred to as "Vanguard." The Vanguard Group is one of the world's largest index fund managers for traditional stock and bond markets. Instead of actively trading securities in an effort to beat the market, an index fund manager simply holds all, or a representative sample, of the securities in the index. In contrast, an active fund manager buys and sells securities regularly in pursuit of maximum gain.

Investors typically place money in an index fund to replicate the performance of a market. Mature, liquid marketplaces have a host of well-defined benchmarks or indices, which corresponding index funds seek to replicate. For example, the S&P 500, Russell 2000, and Wilshire 5000 all are benchmarks whose performances are mimicked by index funds. The benchmark represents the passive alternative—a portfolio that faithfully replicates asset class performance.

However, "beating the market, as described by a fair benchmark, constitutes the foremost object of an investment manager." See David F. Swensen, Pioneering Portfolio Management, The Free Press, 2000, page 300, cited hereinafter as "Swensen." And although everyone would like to outperform the market, Vanguard believes "it's more difficult than you might think . . . [because] investing is a Zero-Sum Game, mutual fund costs diminish returns, and financial markets are efficient." See Vanguard.

David Swensen, Chief Investment Officer of the Yale University endowment, echoes the problems of engaging in an active strategy:

> In spite of the daunting obstacles to active management success, the overwhelming majority of market participants choose to play the loser's game. Like the residents of Lake Wobegon, who all believe their children to be above average, all investors believe their active strategies will produce superior results. The harsh reality of the negative sum game dictates that in aggregate, active managers lose to the market by the amount it costs to play, in the form of management fees, trading commissions, and dealer spread. Wall Street's share of the pie defines the amount of performance drag experienced by the would-be market beaters.

Swensen, page 6.

Because of the difficulty in adding value through active management, many investors in equity and debt markets have chosen to employ passive strategies. Popularized by Vanguard and Barclays Global Investors, index funds use a statistical sampling of securities in a defined market to replicate the performance of that market.

Lack of Index Funds in Alternative Investment Strategies

Despite having years of experience purchasing stocks and bonds, institutional and high net worth investors have only recently added alternative investment strategies to their investment portfolios. In contrast to traditional stock and bond portfolios, alternative investment strategies do not have index funds that offer investors a passive alternative to actively managed portfolios. Not only is the market or benchmark difficult to define, creating an index fund to encompass a defined market has an assortment of its own difficulties. As a result, surveyors of the alternative investment arena have assumed that investable indices in alternative strategies cannot exist.

For example, Swensen believes that "investors in alternative asset classes must pursue active management since market returns do not exist in the sense of an investable passive option." Swensen even defines the term "absolute return" to impress that lack of an index: "Absolute return investments seek to generate high levels of returns, independent of market results, contrasting with the relative, benchmark-beating gains pursued by active marketable security managers." See Swensen, pages 204-05.

As another example, UBS Warburg makes the assumption that alternative investment strategies are de facto measured based on absolute performance. In comparing hedge funds to mutual funds, UBS Warburg claims "hedge funds are measured based on absolute performance, mutual funds are usually measured based on relative performance." See Alpha, page 54.

Existing Performance Benchmarks

A prerequisite for developing an index fund is the definition of the applicable performance benchmark. Currently, investors in hedge funds measure performance against an absolute return hurdle or against other alternatives (hedge fund peers). However, as explained below, neither benchmark approach can be replicated in an index fund.

The early adopters of alternative investment strategies measured active managers against an absolute hurdle—for example, an annual 8% real return. While investors would relish the certainty of investing in a known 8% real return, no vehicles exist to do so. Thus, an absolute return benchmark as high as the aspirations for this asset class cannot be turned into an index fund for passive investors.

More recently, consulting organizations such as the Hennessee Group LLC, Hedge Fund Research Inc., and Tremont Advisers, Inc. have constructed peer indices aggregating hedge fund performance from databases. While such peer indices provide a numerical benchmark, the indices suffer from measurement biases that are rampant in databases of historical hedge fund returns. As noted by William Fung and David A. Hsieh (in "Benchmarks of Hedge Fund Performance: Information Content and Biases," Research paper, Fuqua School of Business, Duke University, February 2001, cited hereinafter as "Hedge Fund Benchmarks", pages 2-4), hedge fund databases suffer from survivorship bias and selection bias.

Survivorship bias arises when a sample of hedge funds includes only funds that are operating at the end of the sampling period and thus excludes funds that have ceased operations during the period. From the universe of all hedge funds, those that ceased to exist before database vendors started data collection, ceased operations ("dead funds"), or simply exited a database, whether voluntarily or not ("defunct funds"), all cause tracking error between the peer index and the universe of hedge funds. Academics have estimated that survivorship bias in hedge fund peer indices averages 2% per annum. See Gaurav S. Amin and Harry M. Kat, "Welcome to the Dark Side: Hedge Fund Attrition and Survivorship Bias Over the Period 1994-2001," working paper, Dec. 11, 2001, page 2.

Selection bias further degrades the accuracy of peer indices. Hedge funds that enter databases typically do so to attract outside investor capital. Presumably, only those funds that have "good" performance and are looking to attract new investors want to be included in a database. Therefore, hedge funds in a database tend to have better performance records than those that are excluded. In contrast, successful "closed" hedge funds with no reason to attract outside capital may have no need to be included in databases. This effect would cause databases to understate industry performance. Both self-selection biases create errors in the historical reporting of peer indices. See, e.g., Hedge Fund Benchmarks, pages 7-9. As a result of such measurement biases, peer indices do not accurately reflect the hedge fund market.

Due to the inherent biases in existing peer indices, Fung and Hsieh come to the conclusion that "if we want to estimate the investment experience of hedge funds, why not look directly at the experience of the hedge fund investors themselves." They recommend looking at the investment records of funds-of-hedge funds (FOFs):

> Survivorship bias in FOFs' returns relative to the universe of all hedge fund investors is less severe than using individual hedge funds. This is because FOFs, through the natural process of diversification, have inadvertently minimized the measurement errors that may arise. Also, the question of selection bias is much more muted in the case of FOFs due to the fact that all individual hedge funds are likely to have some FOF investors irrespective of whether they report performance to any hedge fund database . . . we would argue that using FOFs as building blocks for hedge fund performance benchmarks is a better alternative to individual funds.

Hedge Fund Benchmarks, pages 10-12.

Although Fung and Hsieh reach the conclusion that funds of funds should be used as "building blocks" for hedge fund performance benchmarks, they do not disclose creating an investable index fund based on an index of funds of funds. Consequently, they also fail to disclose how such a fund might be created and managed. In fact, they implicitly assume and suggest that the fees for such a fund would make it impractical (see page 12 of Hedge Fund Benchmarks, where returns for broad-based indices (that is, indices of hedge funds) were estimated to be "roughly the same" as for FOF indices). This implies that the extra layer of fees that an index fund based on an index of funds of funds would entail would cause such an index fund to be noncompetitive.

Hedge Fund Benchmarks discloses that certain commercial databases have posted indices based on funds of funds. However, they have not managed to create a fund based on those indices, nor does Hedge Fund Benchmarks disclose a practical method of creating and managing such a fund. Implementation of a portfolio for such a fund is far from trivial, as shown below. For example, a clearly defined set of rules for the inclusion of certain funds of funds in the portfolio (e.g., size, track record, positions, concentration) is required. The indices mentioned in Hedge Fund Benchmarks simply attempt to include all of the FOFs in their database, resulting in tracking errors similar to those in hedge fund databases. Further, there is no suggestion in Hedge Fund Benchmarks that a fund based on those indices would not cost an investor in the index fund an extra layer of fees beyond the hedge fund manager fees and funds of funds manager fees.

Index Fund Attempts

A few financial services firms (notably Zurich Capital Markets and Morgan Stanley) have attempted to create an investable hedge fund index through investment in a portfolio of hedge funds. In its marketing materials, Zurich describes its methodology as follows: "The Indices' methodology begins by identifying a set of candidate hedge fund managers who are potential members of any of the Indices . . . the candidates include all managers who actively report data to public databases, as well as other manager who are non-reporters but who are identified through other means."

Creating an index fund through investment in other hedge funds has a series of theoretical and practical problems. First, the universe of all hedge funds is not known. Although commercial databases collect information on funds, some of the best and worst hedge funds do not appear in the databases (for reasons described above). Without knowledge of the characteristics of the universe of hedge funds, creating a competent statistical sample is problematic.

Second, many leading hedge funds are closed to new investors. Longstanding survivors in the business that do not accept new investment capital are outside of the universe of opportunities available to a new fund of funds. Many of these funds drive the performance that institutional investors desire when allocating capital to alternative investment strategies.

Third, investors in an index fund want immediate diversified exposure to the asset class. A new hedge fund index may have difficulty building an appropriate diversified portfolio.

Fourth, the administration of investment in hundreds of funds (the number likely required for a statistically representative sample) would be a logistical nightmare. The universe of hedge funds is very large (estimated at over 6,000 funds) and complex (one industry-leading database currently lists 25 separate strategies for hedge fund investments). Creating a rigid process to maintain an index fund is extraordinarily difficult with an ever-changing industry. Given these constraints, perhaps it is not surprising that the vehicles introduced by Zurich and Morgan Stanley have thus far failed to be embraced by outside investors.

There is thus a need for a hedge fund index based on a portfolio of funds of funds that solves the problems described above. Such an index fund would preferably: (a) mimic the experience of hedge fund investors; (b) provide immediate exposure to the entire market; (c) comprise an important component of the market; (d) be systematically replicable; and (e) provide a low-cost, passive alternative to fund-of-funds investments.

Mimicking the Experience of Hedge Fund Investors

In order to diversify across strategies, investors in hedge funds create a portfolio of multiple managers. An index fund constructed by investment in a portfolio of FOFs preferably provides an investable passive alternative capable of replicating the experience of hedge fund investors broadly.

Immediate Exposure to the Entire Market

An index fund formed by direct hedge fund investment cannot offer exposure to currently closed hedge funds. In contrast, a fund formed by investment in funds of funds is more likely to gain access to closed funds, as existing funds of funds are often clients of closed funds.

Important Component of the Market

According to UBS Warburg, funds of funds manage 20-25% of all hedge fund assets. See Alexander M. Ineichen CFA, *The Search for Alpha Continues—Do Fund of Hedge Funds Managers Add Value?*, UBS Warburg Global Equity Research, September 2001, page 28. While industry researchers estimate a universe of 6,000 hedge funds, the Altvest database counts only 375 funds of funds, and only 72 with over $100 million in assets.

Systematic Replication Achievable

As opposed to administering a portfolio with hundreds if not thousands of hedge funds, investment in a far smaller number of funds of funds is readily achievable and can offer the same exposure as a portfolio of direct investments in hedge funds. Fung and Hsieh note that "it takes fewer FOFs to deliver the same diversification benefit as individual hedge funds, and FOFs are likely to have a more uniform redemption policy than individual funds." Hedge Fund Benchmarks, page 10.

Low Cost Passive Alternative

One perceived problem with the creation of a portfolio of FOFs is the addition of yet another layer of fees on top of those of the hedge fund manager and the FOF manager. It would be preferable to maintain fee to investors at the same fee level as would occur if the investors placed capital in a FOF.

SUMMARY OF THE INVENTION

The present invention comprises a method for creating and managing an investable hedge fund index through investment in a portfolio of FOFs. The invention also comprises software for performing the method. Those skilled in the art will recognize how to create such software by reading the description of the method. No particular format for such software is required. However, the method is preferably performed using a database of a particular structure. That structure is described herein.

A preferred embodiment of the present invention comprises a method of creating and managing an index fund based on an index of funds of hedge funds, comprising steps of (a) identifying potential funds for an index of funds of hedge funds; (b) identifying which of the potential funds meet specific criteria selected so as to minimize biases comprising selection bias and survivorship bias; (c) creating an index by indexing funds identified as meeting the criteria; (d) acquiring a portfolio of funds in the index; and (e) allocating capital to funds in the portfolio.

Preferably, but not necessarily, one or more of the following conditions are also satisfied: (1) the potential funds are identified by searching available commercial databases; (2) the specific criteria comprise one or more of the following: (a) fund size; (b) fund diversification; (c) fund track record; (d) reasonableness of fees charged; (e) length of fund history; (f) concentration criteria; (g) resemblance of a fund or group of funds to a closed fund; or (h) other criteria; (3) capital is allocated to funds equally across funds; or (4) capital is allocated to funds according to fund size.

In alternate embodiments, the invention further comprises one or more of the following: (1) rebalancing the portfolio periodically; or (2) negotiating fee discounts sufficient to enable a manager of the index fund to charge fees to investors that are at the same level as if the investors had invested in a fund of hedge funds.

The invention also comprises software to perform the steps of the methods described above. In particular, the invention comprises software wherein data regarding potential funds is stored in a database according to object role modeling. A preferred database structure is described below.

A system for performing the steps described above is also comprised in the present invention. The system comprises a database storing potential funds for an index of funds of hedge funds and a central processing unit in communication with the database, the processing unit operative to: (1) identify which of the potential funds meet specific criteria selected so as to minimize biases comprising selection bias and survivorship bias; (2) create an index by indexing funds identified as meeting the criteria; (3) construct a portfolio of funds in the index; and (4) allocate capital to funds in the portfolio.

DETAILED DESCRIPTION OF PREFERRED EMBODIMENTS

An Investable Hedge Fund Index (IHFIF) of the present invention preferably works similarly, on an operational level, to a mutual fund. Investors have the opportunity to contribute and withdraw capital on a periodic basis, the capital is invested in a defined strategy, the fund administrator calculates a net asset value (NAV), and accrued fees and expenses are deducted from the asset value. The preferred IHFIF differs from a mutual fund at least in frequency of openings for contributions and withdrawals (e.g., quarterly as opposed to daily for mutual funds), and investment strategy (e.g., investing in a portfolio of FOFs as opposed to a portfolio of stocks or bonds).

Figure 1:
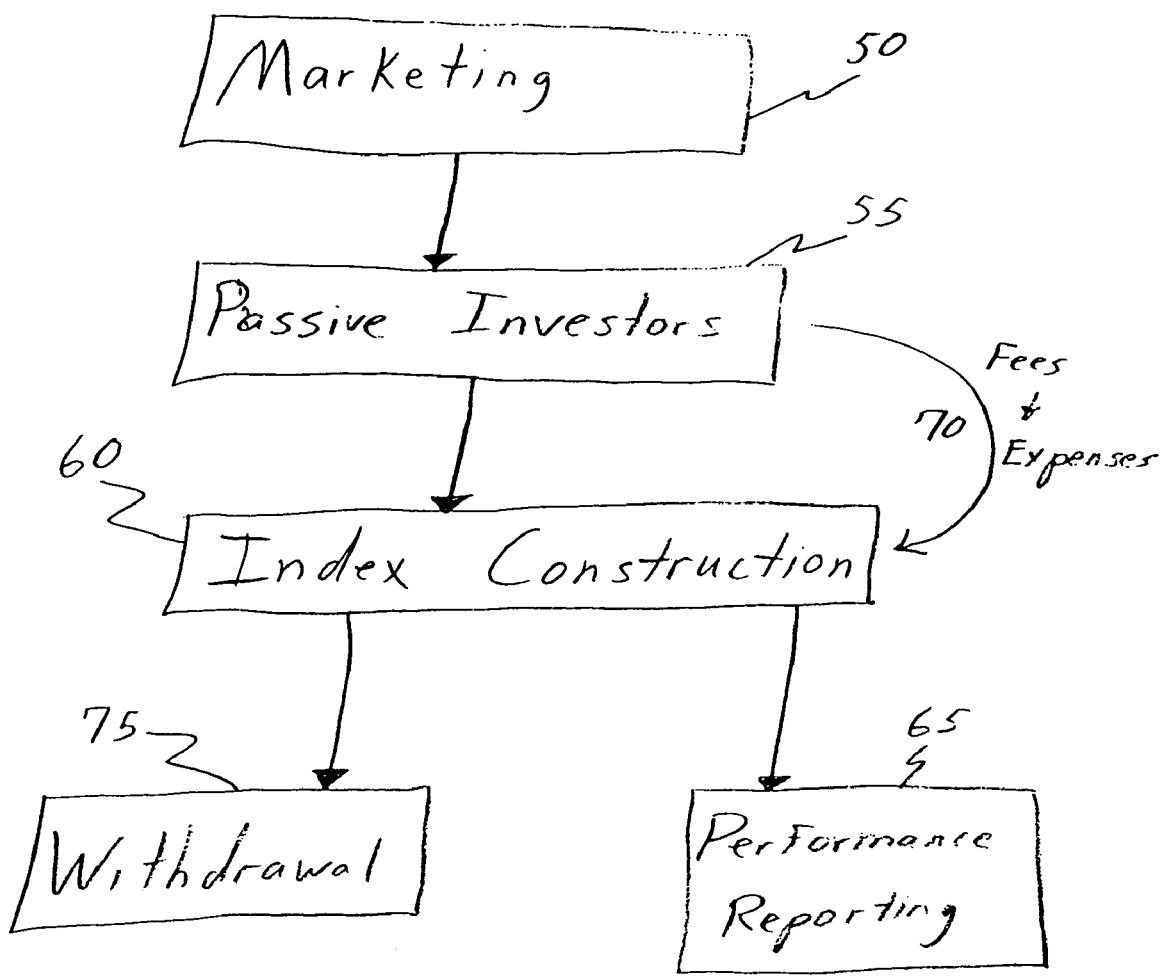
FIG. 1 depicts major steps of a preferred investment method.

Major steps of a preferred investment method are illustrated in FIG. 1. Step 50 is a marketing step, wherein funds are solicited from potential investors. Through direct marketing, outsourced marketing, and/or a distribution joint venture, an administrator of a preferred IHFIF identifies investors for the index fund.

At step 55, investors wire funds to IHFIF. Once an investor decides to invest in IHFIF, he sends funds to the IHFIF administrator, which directs the funds to the IHFIF account. The investor receives shares in IHFIF, the amount of which is preferably calculated by the following formula: Shares=(Wire Amount−Transfer Costs)/(NAV of IHFIF).

Figure 2:
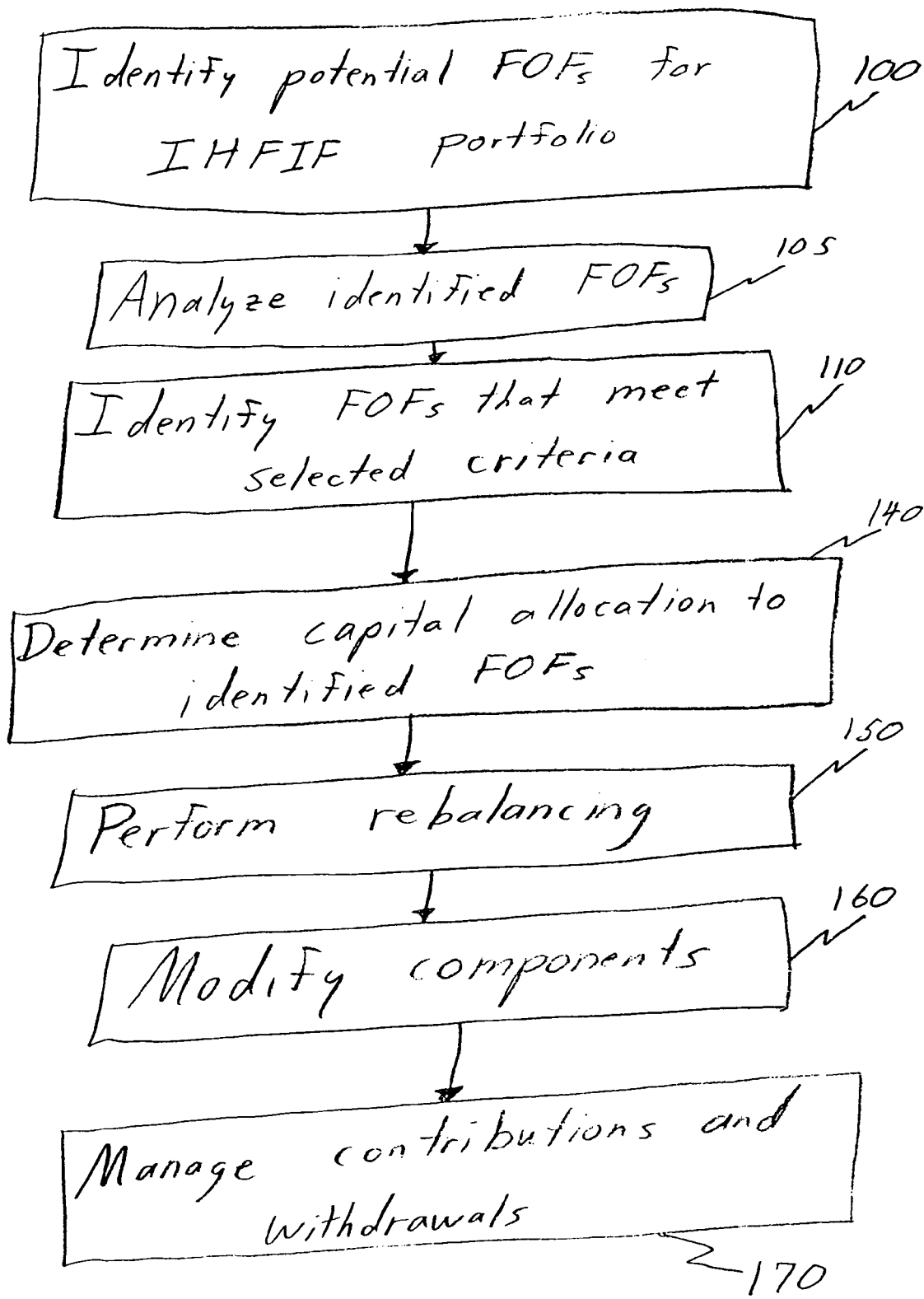
FIG. 2 depicts major steps of a preferred index creation process.
Figure 3:
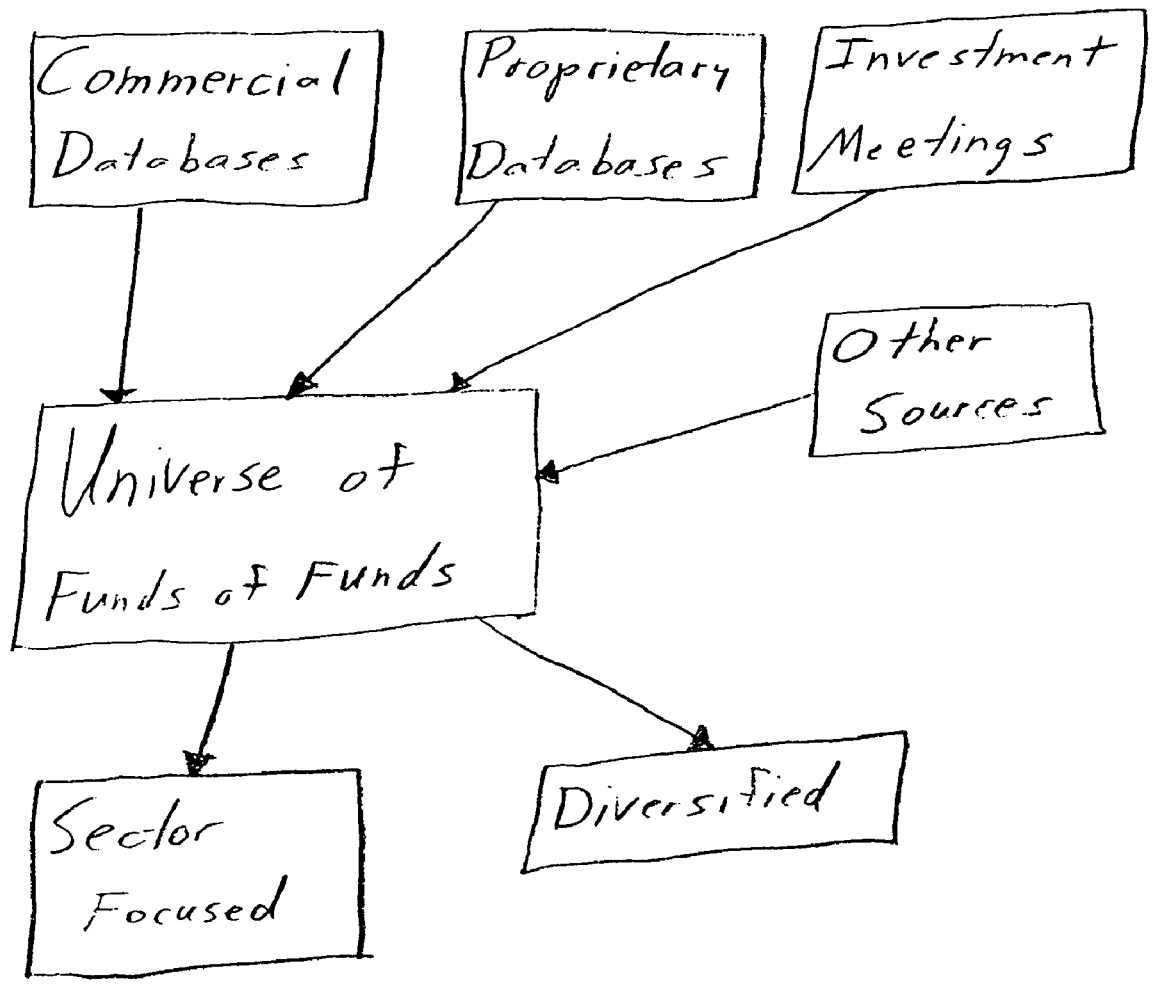
FIG. 3 depicts a preferred fund identification process.

At step 60, IHFIF managers construct a preferred index fund. This process is illustrated in FIG. 2 and described in detail below.

At step 65, IHFIF calculates performance and reports to investors. Periodically (quarterly, monthly, or as frequently as achievable) IHFIF informs its investors of the performance of the fund.

At step 70, a manager of IHFIF receives management fees and is reimbursed for certain expenses associated with managing the funds.

At step 75, withdrawals are performed. Periodically (e.g., quarterly or as available based on the redemption features of FOFs) IHFIF allows investors to withdraw their capital from the fund. An investor in IHFIF is preferably permitted to withdraw in an amount equal to the following: Withdrawal Amount=NAV*Shares−Costs of Transfer.

Construction of Index (see FIGS. 2-7).

Once funds are sent to IHFIF, the manager follows a strict methodology to create and maintain an investable index of hedge funds through investment in a portfolio of FOFs.

Referring now to FIG. 2, at step 100 potential FOFs for the IHFIF portfolio are identified. A manager of IHFIF searches available commercial databases (one example of a typical commercial database is InvestorForce Inc.'s Altvest database, but there are many others, any or all of which would be searched by a preferred embodiment of the present invention) to find potential FOFs that meet IHFIF's criteria for investment (see FIG. 3). Further, IHFIF may include in the opportunity set funds not listed in commercial databases but that the manager has reviewed in the normal course of business. All funds of funds identified constitute the universe of funds of funds, and are listed in a database. At step 105 the universe is analyzed in order to identify sector-focused FOFs and diversified FOFs.

At step 110 IHFIF identifies in each FOF that meets all selected criteria for inclusion in the portfolio. Such criteria preferably include but are not limited to:

(A) Investment Strategy: a FOF typically has an investment mandate that allows for investment in hedge funds with either diverse investment strategies or focused investment strategies. A diversified FOF has a mandate in its Offering Memorandum that allows for investment in more than one of the following categories: Relative Value, Event-Driven, or Directional. See Table 2 below for a description of hedge fund strategies in each of those three categories. Table 1 describes FOF strategy classifications for the same three categories. A sector-focused FOF preferably has a mandate in its Offering Memorandum that allows for investment in only one of the three categories. A preferred IHFIF invests in both diversified and sector-focused FOFs.

TABLE 1

FOFs Strategy Classification

| Directional | Relative Value | Event Driven |
|---|---|---|
| Equity Long/Short | Capital Structure Arbitrage | Merger Arbitrage |
| Fixed Income | Equity Long/Short | Corporate Reorg/Restr/SpinOff |
| Directional Trading | Fixed Income | Distressed Investments |
| Other | Arbitrage Trading | Special Situations |
| | Other | Strategic Block/Activist |
| | | Other |

TABLE 2

Hedge Fund Classifications

| DIRECTIONAL | RELATIVE VALUE | EVENT DRIVEN |
|---|---|---|
| Equity Long/Short | Capital Structure Arbitrage | Merger Arbitrage |
| Long Bias | Convertible Arbitrage | Corporate Reorg/Restructure/Spin-Off |
| Short Bias | Other | Distressed Investments |
| Long Only | Equity Long/Short | Special Situations |
| Short Only | Equal Weighted: $ neutral | Strategic Block/Activist |
| Long-Short variable | Equal Weighted: beta neutral | Other |
| Other | Pairs Trading | |
| Fixed Income | Other | |
| Directional Trading | Fixed Income | |
| Discretionary Trading | Yield Curve Arbitrage | |
| Tactical Asset Allocation | Other | |
| Systematic | Arbitrage Trading | |
| Trend Following | Index or Basis Trade Arb | |
| Other | Volatility Arbitrage | |
| Volatility | Statistical Arbitrage | |
| Other | Other | |
| Other | Other | |

(B) Size: each FOF in the IHFIF portfolio must be of sufficient size to sustain its operations. To meet the size requirement, a FOF must manage more than a minimum amount of assets. The assets under management minimum preferably are somewhat higher for a diversified FOF (e.g., $75 million) than a sector focused FOF (e.g., $50 million).

(C) Diversification: a FOF in a preferred IHFIF portfolio is adequately diversified. An example of such a diversification measurement requirement is a minimum number of "positions" in the FOF portfolio. For example, a diversified FOF must invest in at least 10 hedge funds while a sector focused FOF must invest in at least 7 hedge funds.

(D) Length of History: A FOF in an IHFIF portfolio must be an active participant in the marketplace. One method to measure participation may be a minimum length of history for a FOF (e.g., 2 years).

(E) Reasonable Fees: For inclusion in an IHFIF, a FOF must charge fees within a reasonable range of the average for the marketplace. For example, the FOF fee structure cannot be significantly higher than the industry average (e.g., within 1 standard deviation of all funds of funds).

Figure 4:
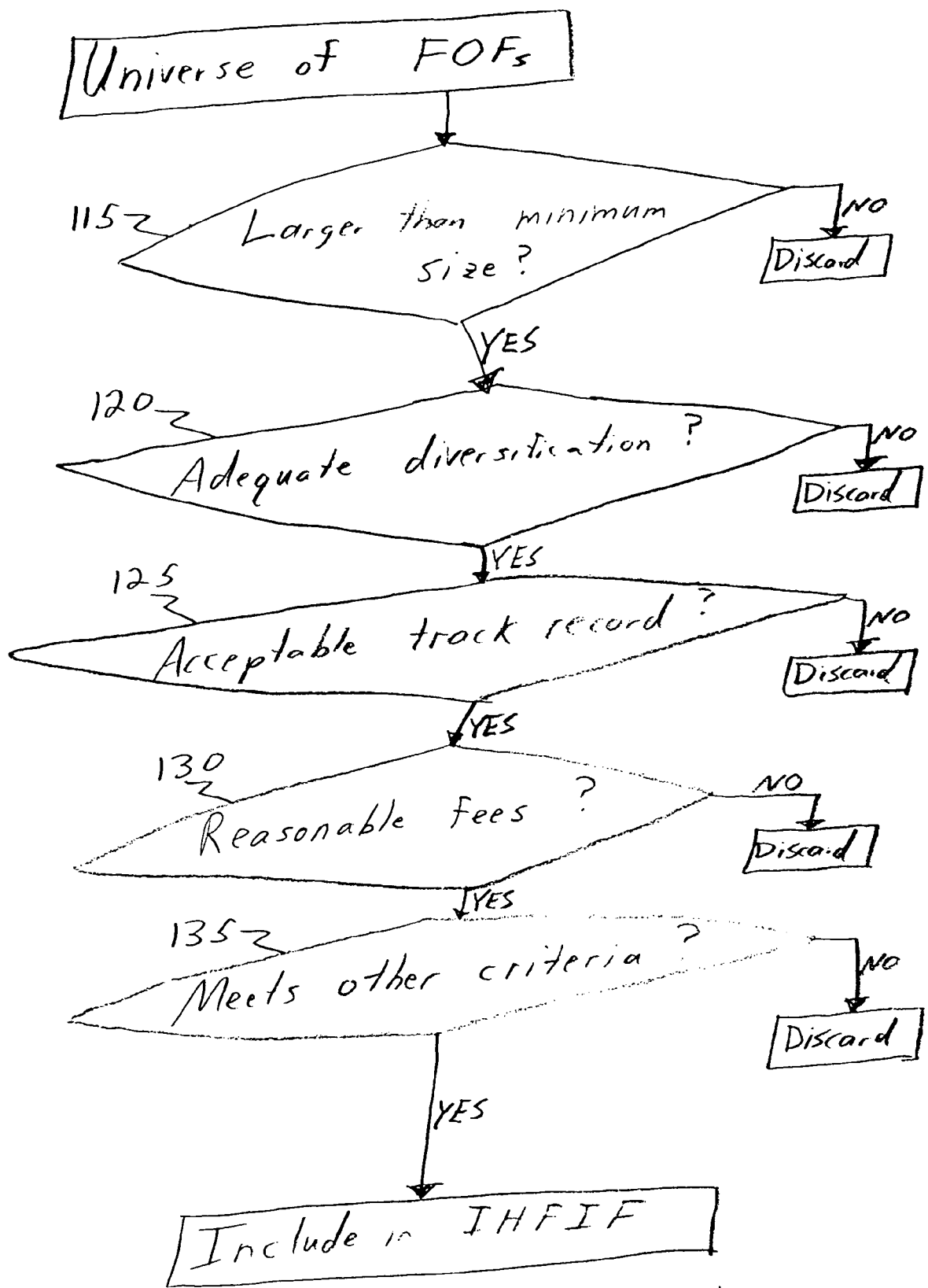
FIG. 4 depicts a preferred fund selection process.

The selection process is illustrated in FIG. 4. The process begins with the universe of FOFs. At step 115 funds below a minimum size are rejected. At step 120 funds without adequate diversification are rejected. At step 125 funds with unacceptable track records are rejected. At step 130 funds not charging reasonable fees are rejected. At step 135 funds not satisfying remaining criteria (such as those listed above) are rejected. The remaining funds comprise the funds indexed in the IHFIF.

Figure 5:
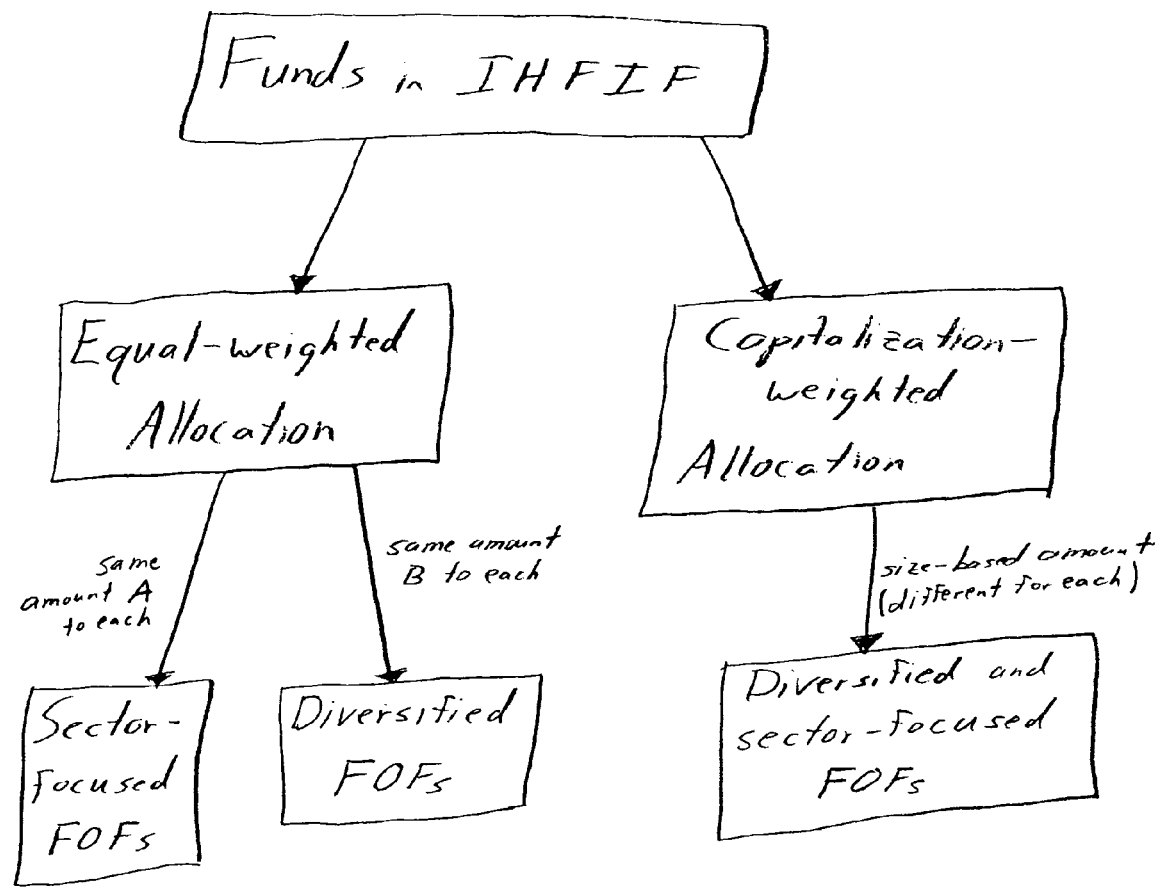
FIG. 5 depicts capital allocation and rebalancing steps.

Returning to FIG. 2, at step 140 capital allocation to funds of funds is determined (see FIG. 5). An IHFIF manager preferably allocates capital to qualifying FOFs weighted either equally across funds (equal-weighted) or by size of the fund (capitalization-weighted), depending on the desired index (e.g., equal weighted for an Equal-Weighted IHFIF).

An equal-weighted portfolio is constructed by investing a similar amount in each of the FOFs in the portfolio. A manager of an IHFIF may choose to allocate two different dollar amounts—one for diversified FOFs and another for sector focused FOFs. A capitalization-weighted portfolio may be constructed by investing in an amount in each of the FOFs in the portfolio that is proportional to the size of the FOF excluding any investment from IHFIF.

Returning to FIG. 2, at step 150 index rebalancing is performed. IHFIF preferably rebalances the portfolio periodically (e.g., quarterly, semi-annually, annually) by shifting capital across FOFs in the portfolio, adding new funds, and removing existing funds to reflect the capital allocation rules used in step 140 as if the funds were newly invested on the rebalancing date.

For example, assume IHFIF invested $100 in each of two FOFs. FOFs earns a 50% return while FOFb earns a 40% return. At the rebalancing date, IHFIF owns $150 in FOFa and $140 in FOFb. In an Equal-Weighted IHFIF, the manager would rebalance the fund by shifting $5 from FOFa to FOFb, resulting in investments in both funds totaling $145. Analogously, in a Capitalization-Weighted IHFIF, relative performance and inflows into the FOFs may have changed the appropriate IHFIF allocation.

Returning to FIG. 2, at step 160 components of the IHFIF are modified as appropriate. The managers of IHFIF preferably monitor commercial databases and FOF competitors not listed in databases to identify new funds for inclusion in the portfolio and funds in the portfolio that no longer meet the IHFIF criteria. IHFIF may rebalance the portfolio at the next rebalancing date after changes in the manager roster are noticed.

Figure 6:
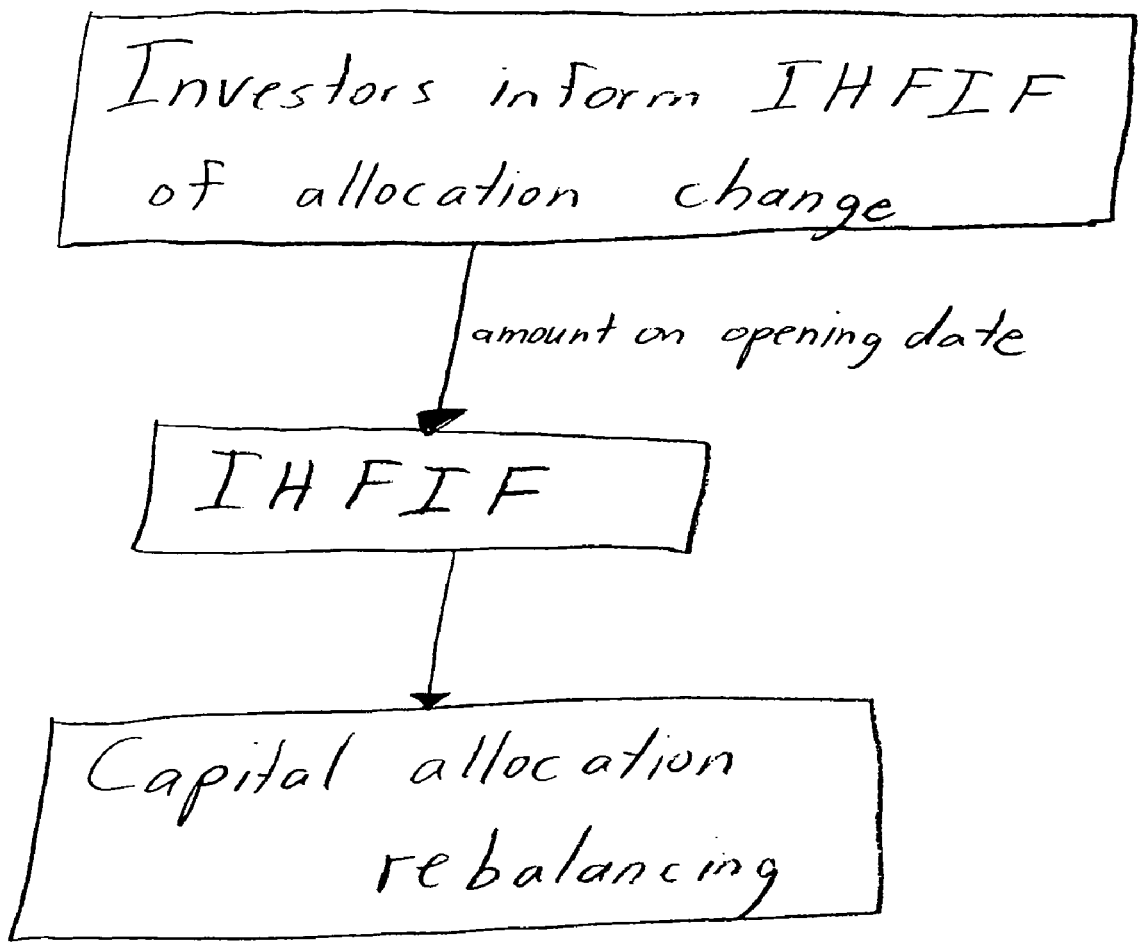
FIG. 6 depicts management of contributions and withdrawals.
Figure 7:
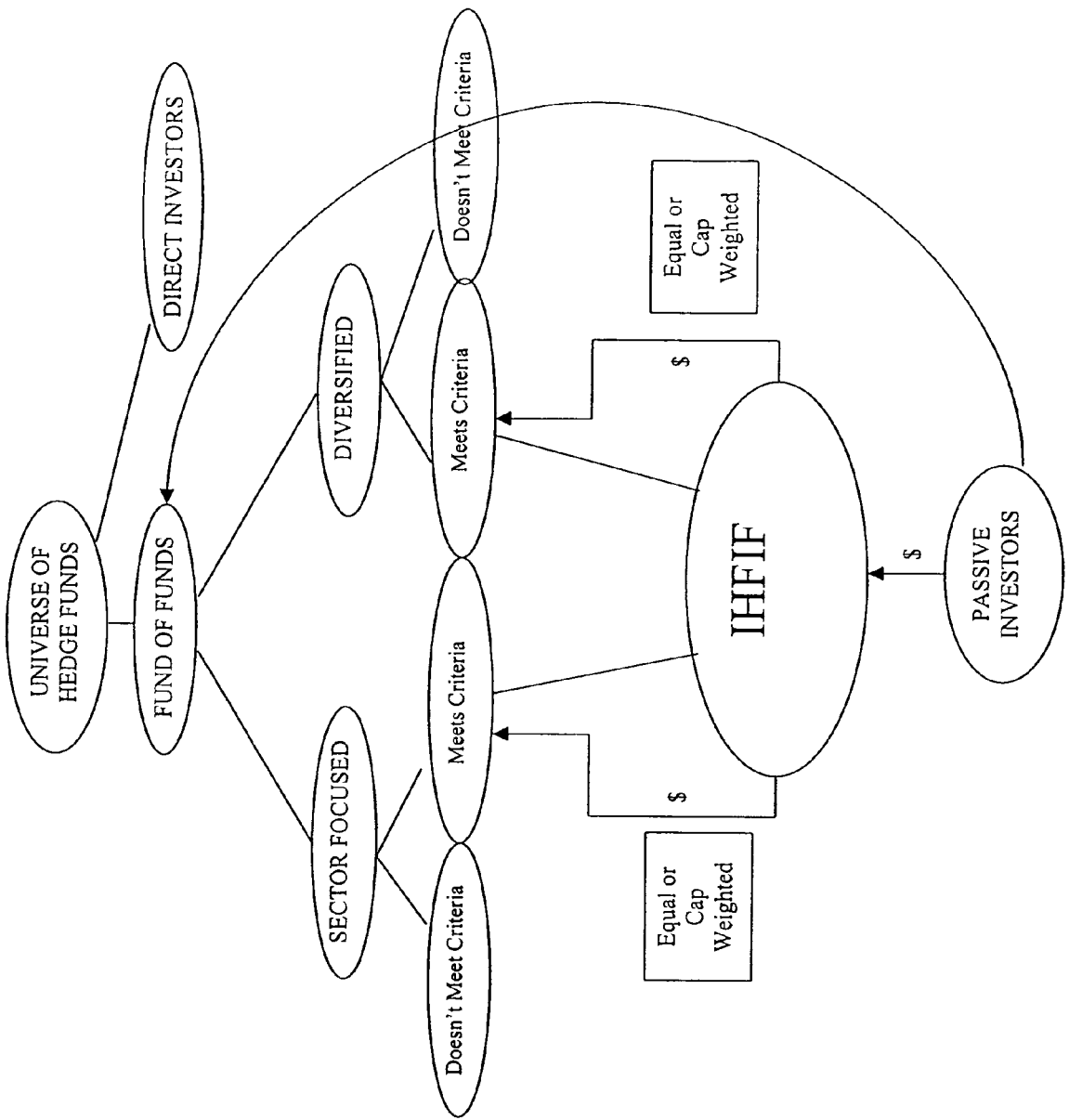
FIG. 7 depicts creation and management of a preferred IHFIF.

At step 170 management of contributions and withdrawals is performed (see FIG. 6). At each IHFIF opening for investor contributions and withdrawals, the manager of IHFIF will rebalance the portfolio according to the process in step 150. In addition, in order to maintain a fully-invested portfolio and to meet contribution and withdrawal requirements of FOFs in the portfolio, IHFIF may use a bank credit line to temporarily bridge funding gaps.

One potential problem with the creation of a portfolio of FOFs is the addition of yet another layer of fees on top of those of the hedge fund manager and the FOF manager. IHFIF maintains fees to its investors at the same fee level as would occur if the investor placed capital in a FOF. To achieve this low cost alternative, a manager of a preferred IHFIF negotiates fee discounts from FOF managers equivalent to the management fees and expenses incurred by the fund.

In a preferred embodiment, concentration criteria (e.g., when rebalancing TIHFI, no one FOF can comprise more than x % of TIHFI) are incorporated into the selection rules. If necessary, more rules may be articulated in advance, in case capitalization weighted or equal weighted portfolios are not achievable. For example, in the event that a fund of funds is "closed," a preferred embodiment looks for the fund that most closely matches the criteria for the fund or includes a collection of funds that together replicate the closed fund.

The software developed to implement the method described herein is preferably executed on one or more central processing units and preferably incorporates a database component with search capability. The database component preferably integrates information from commercial databases and proprietary databases, and optionally includes information from other sources. The search capability allows the user to search the universe of funds in the database to identify funds of funds that meet specified criteria, including but not limited to investment strategy, size, diversification, length of history, and reasonable fees.

The structure of a preferred database is shown in FIGS. 8-26.

Figure 8:
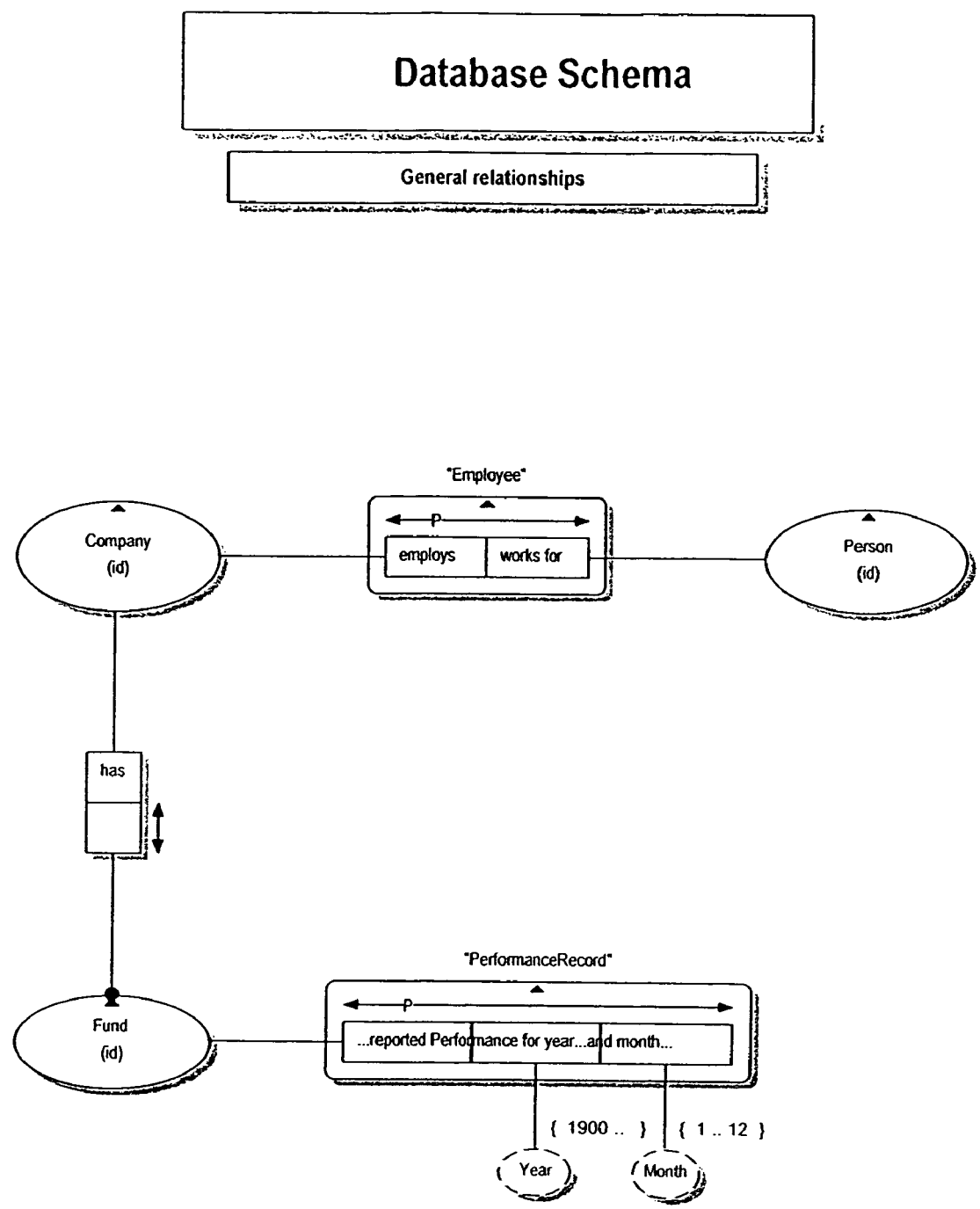
FIG. 8 depicts a preferred schema for describing general relationships of a fund.

FIG. 8 depicts a preferred schema for describing general relationships of a fund.

Figure 9:
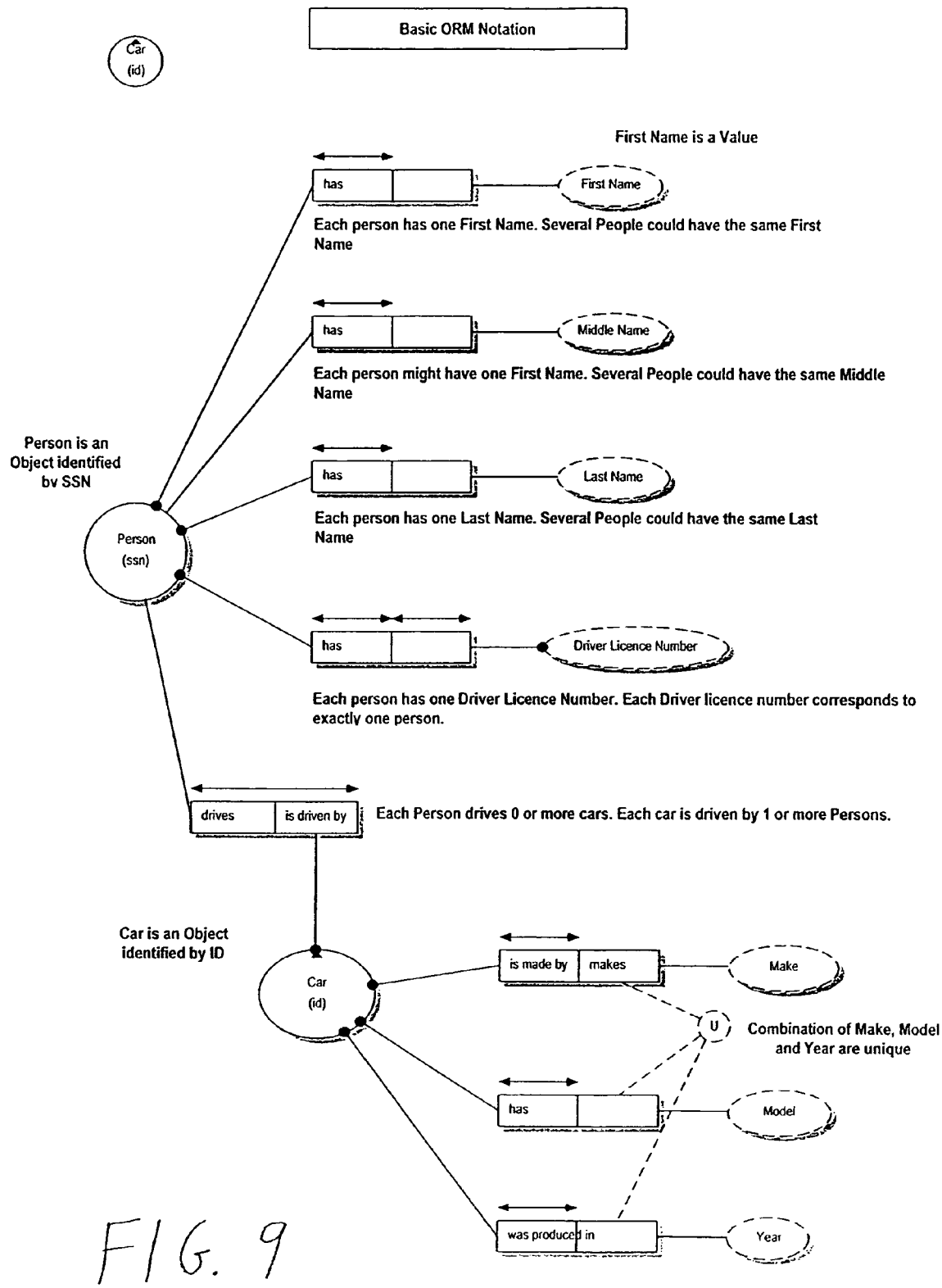
FIG. 9 illustrates basic object role modeling (ORM) notation.

FIG. 9 illustrates basic object role modeling (ORM) notation. For an in-depth treatment of ORM, see Halpin, T. A., *Information Modeling and Relational Databases* (2001).

Figure 10:
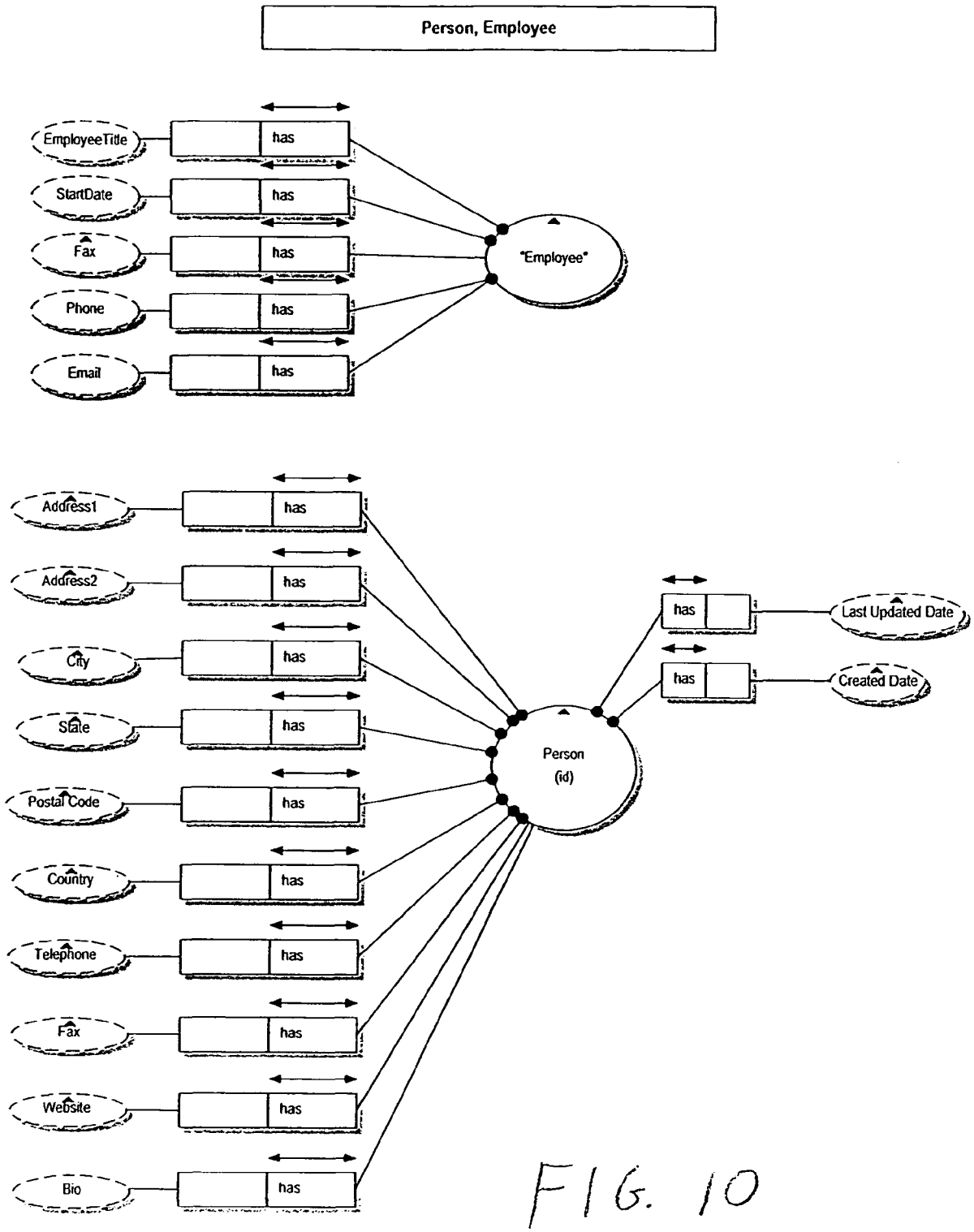
FIG. 10 depicts preferred ORM diagrams for "Person" and "Employee."

FIG. 10 depicts preferred ORM diagrams for "Person" and "Employee."

Figure 11:
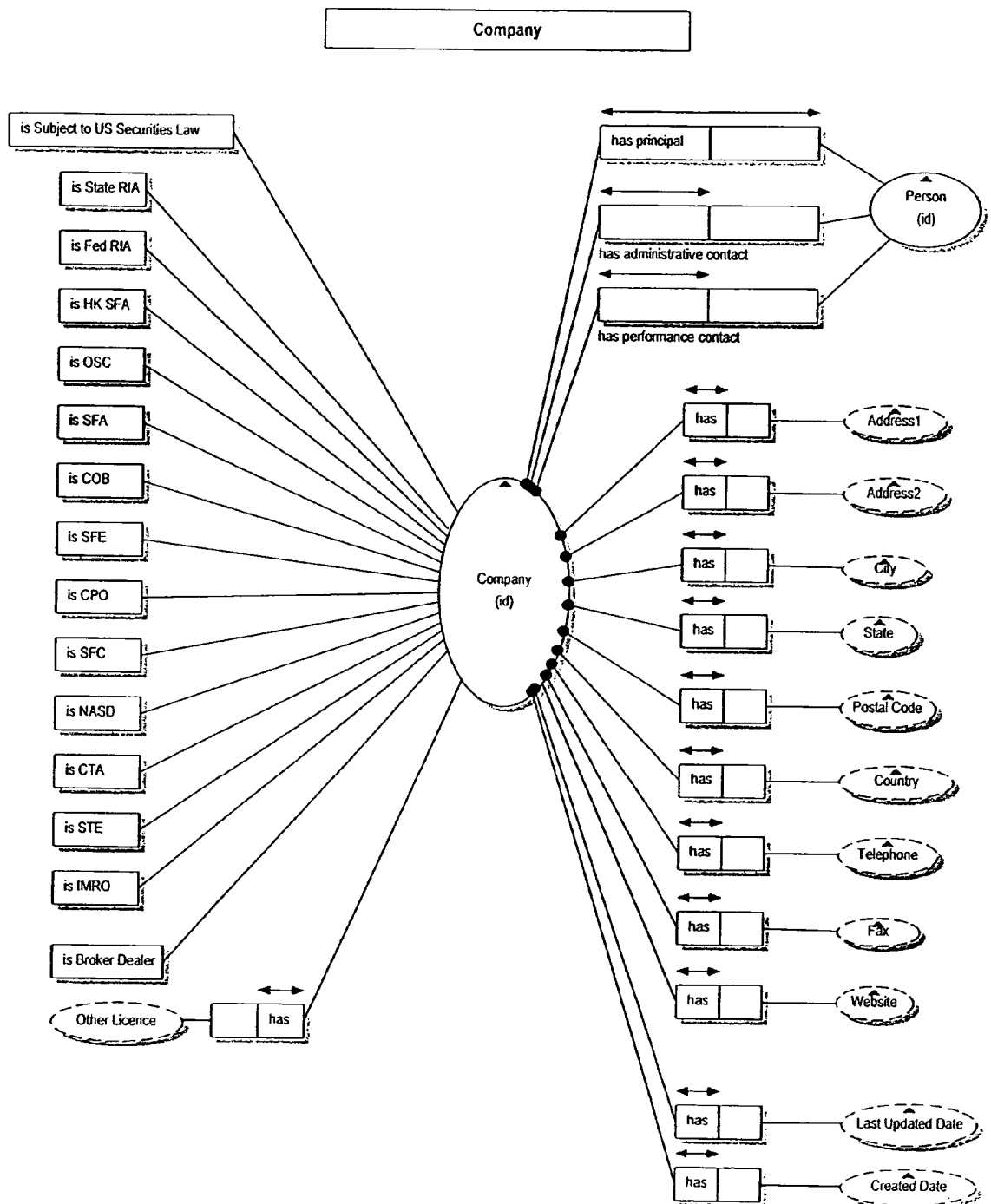
FIG. 11 depicts a preferred ORM diagram for "Company."

FIG. 11 depicts a preferred ORM diagram for "Company."

Figure 12:
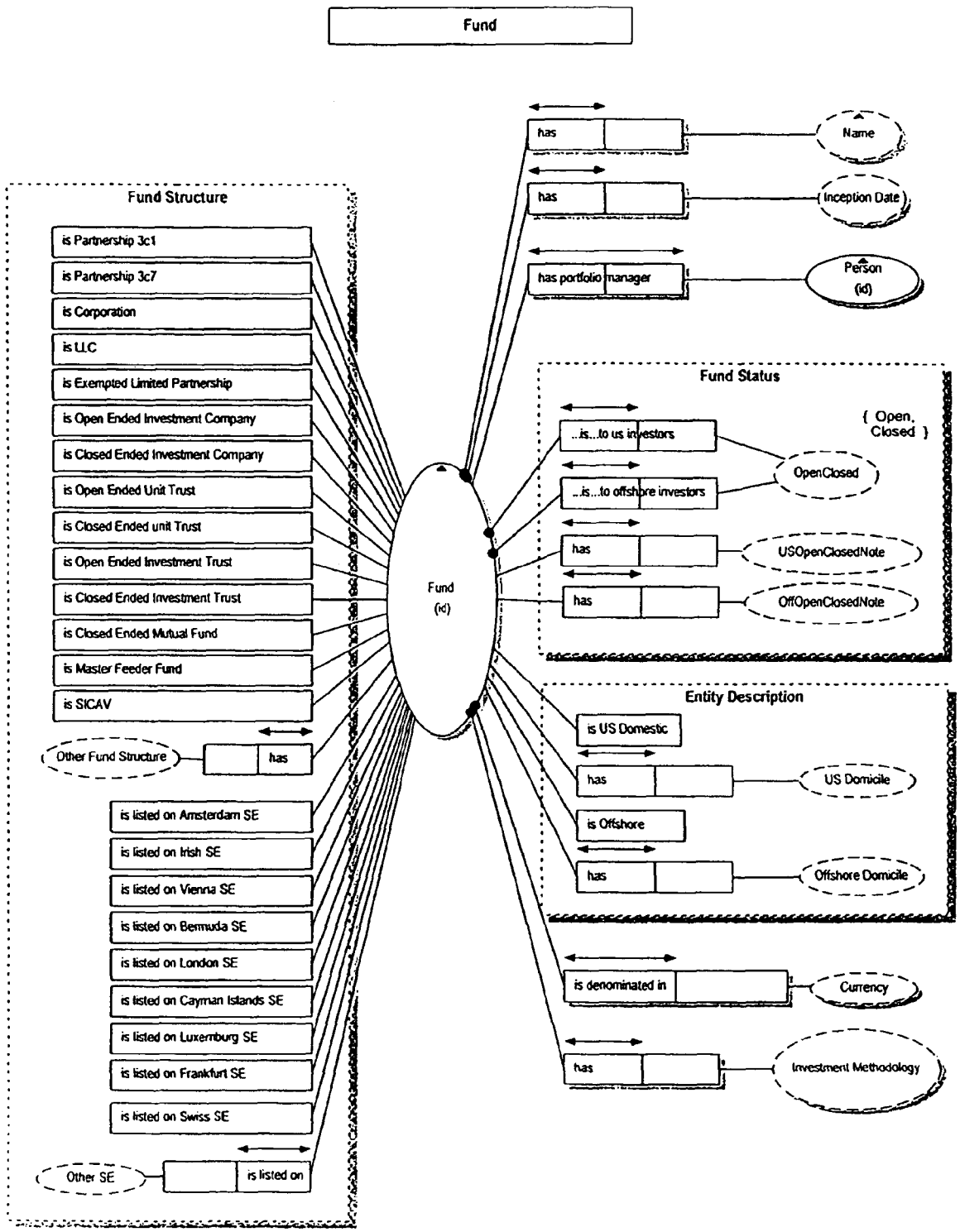
FIG. 12 depicts a preferred ORM diagram for "Fund."

FIG. 12 depicts a preferred ORM diagram for "Fund."

Figure 13:
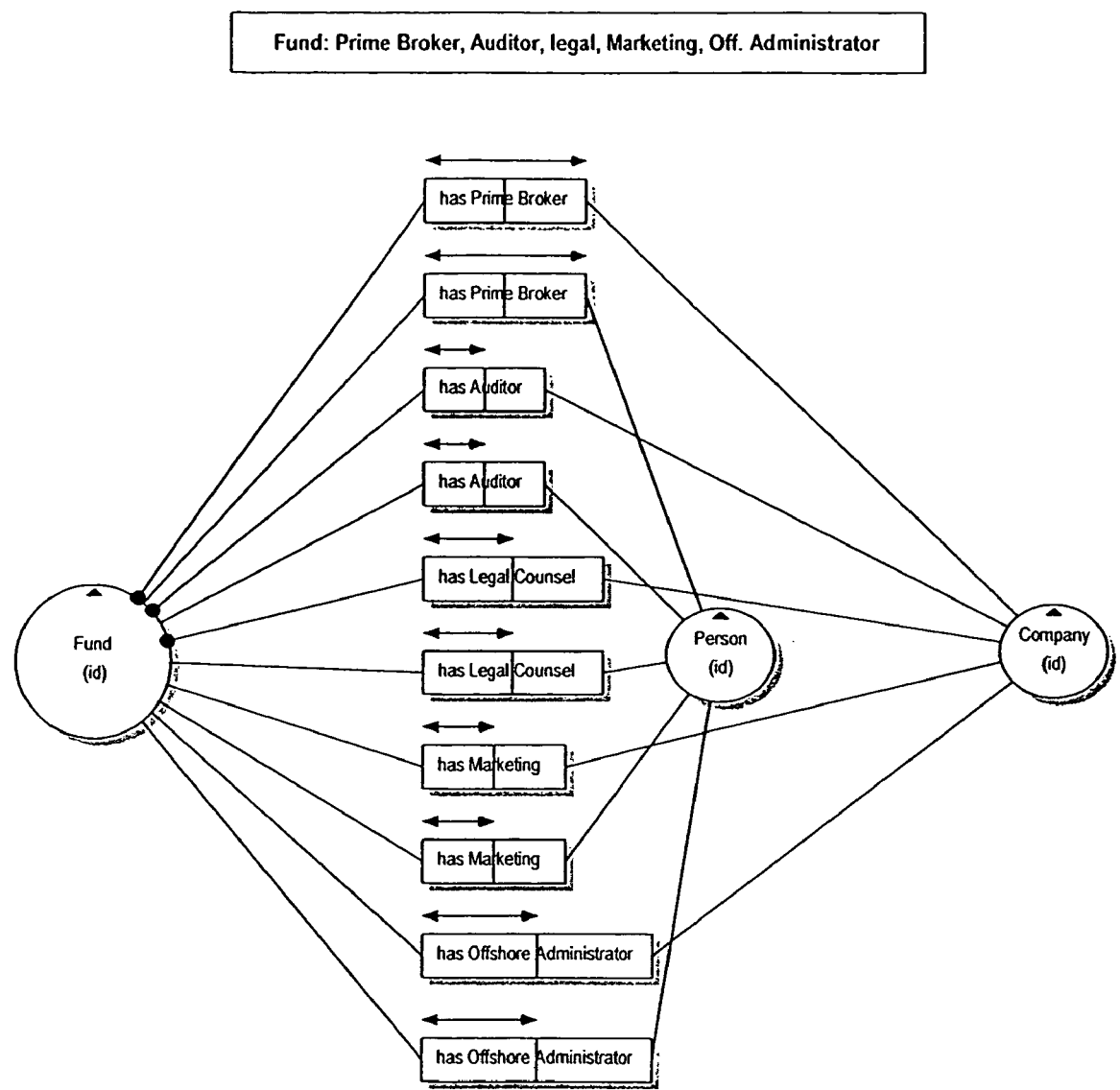
FIGS. 13-22 depict additional ORM diagrams for "Fund."
Figure 14:
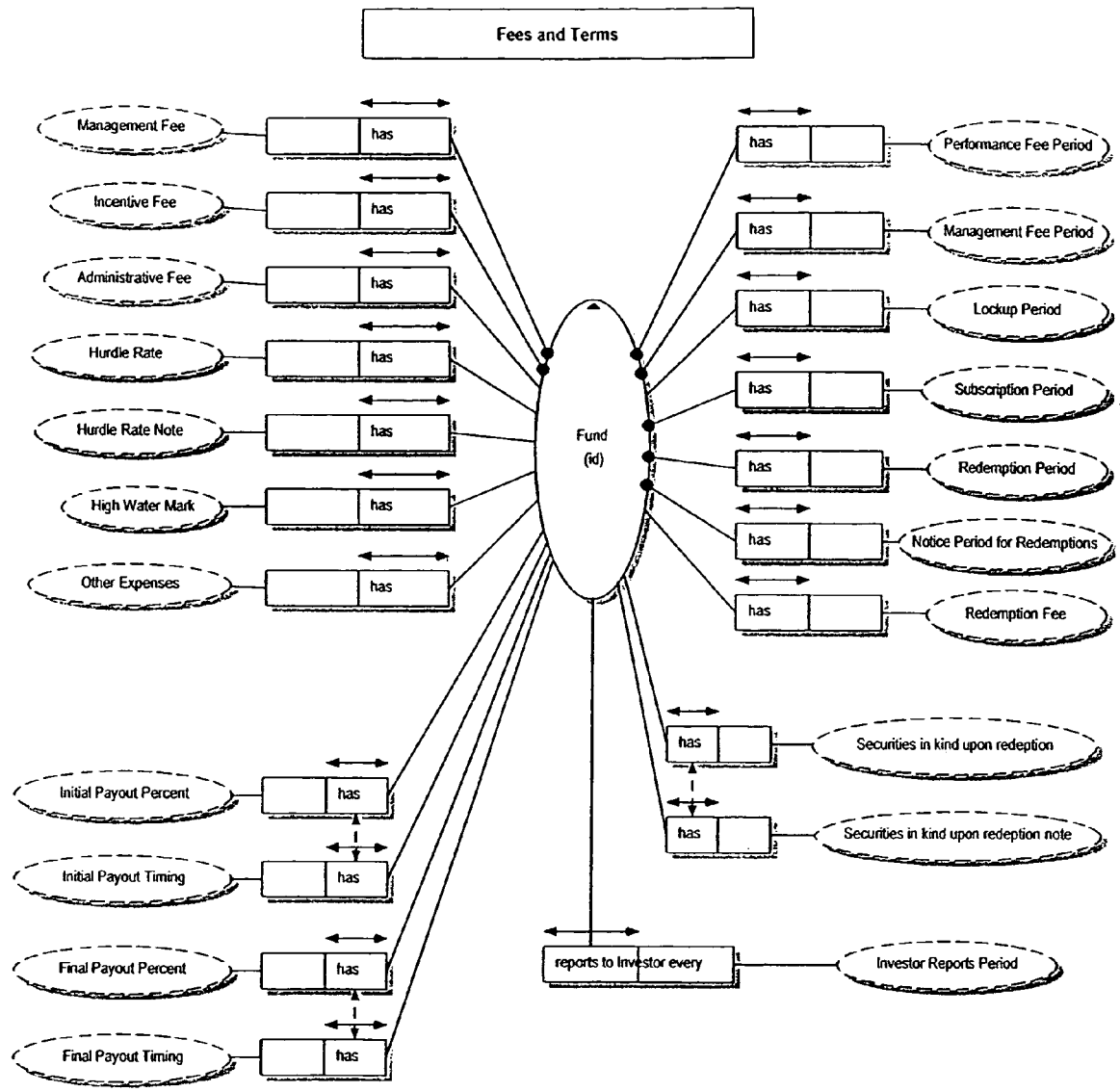
Figure 15:
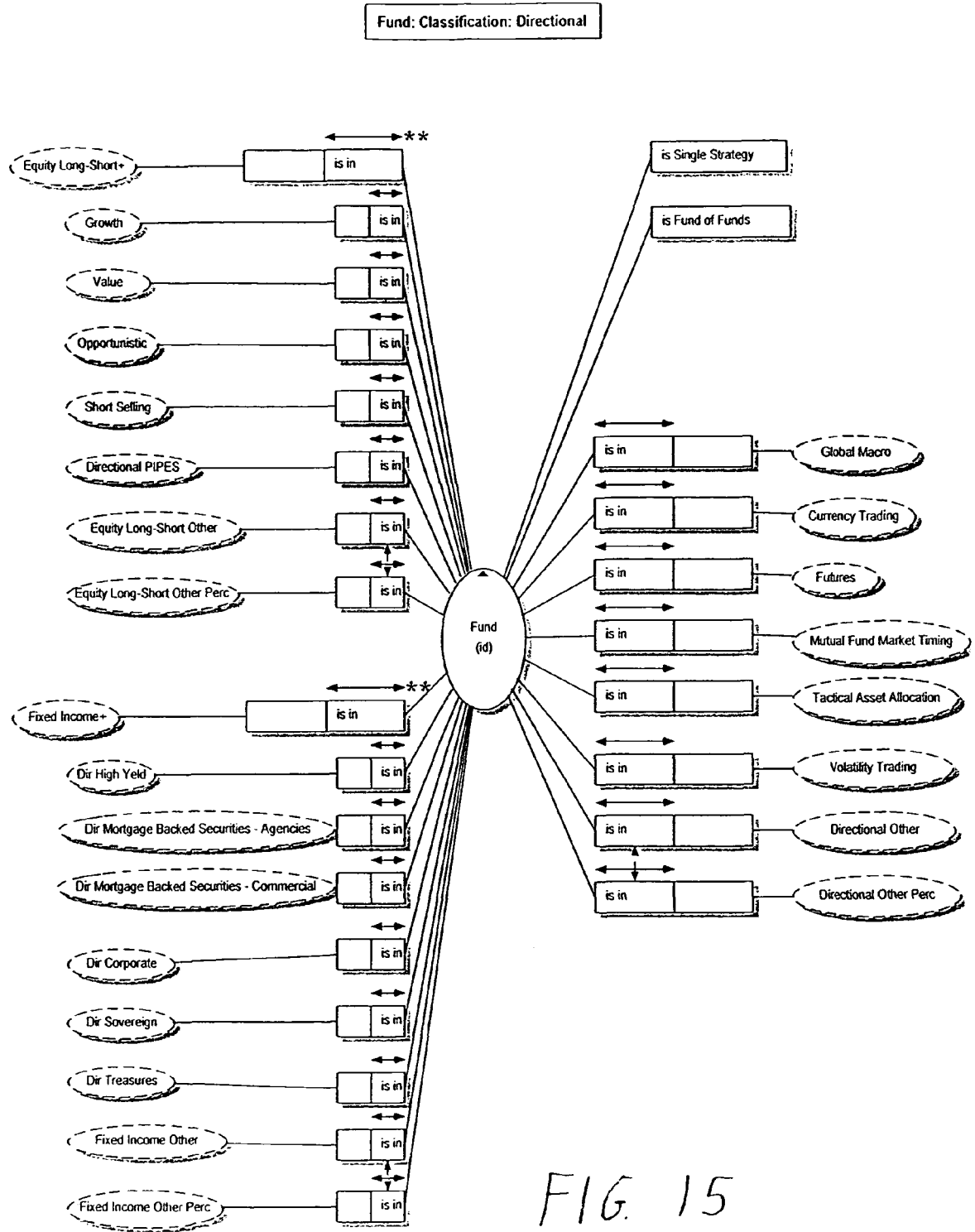
Figure 16:
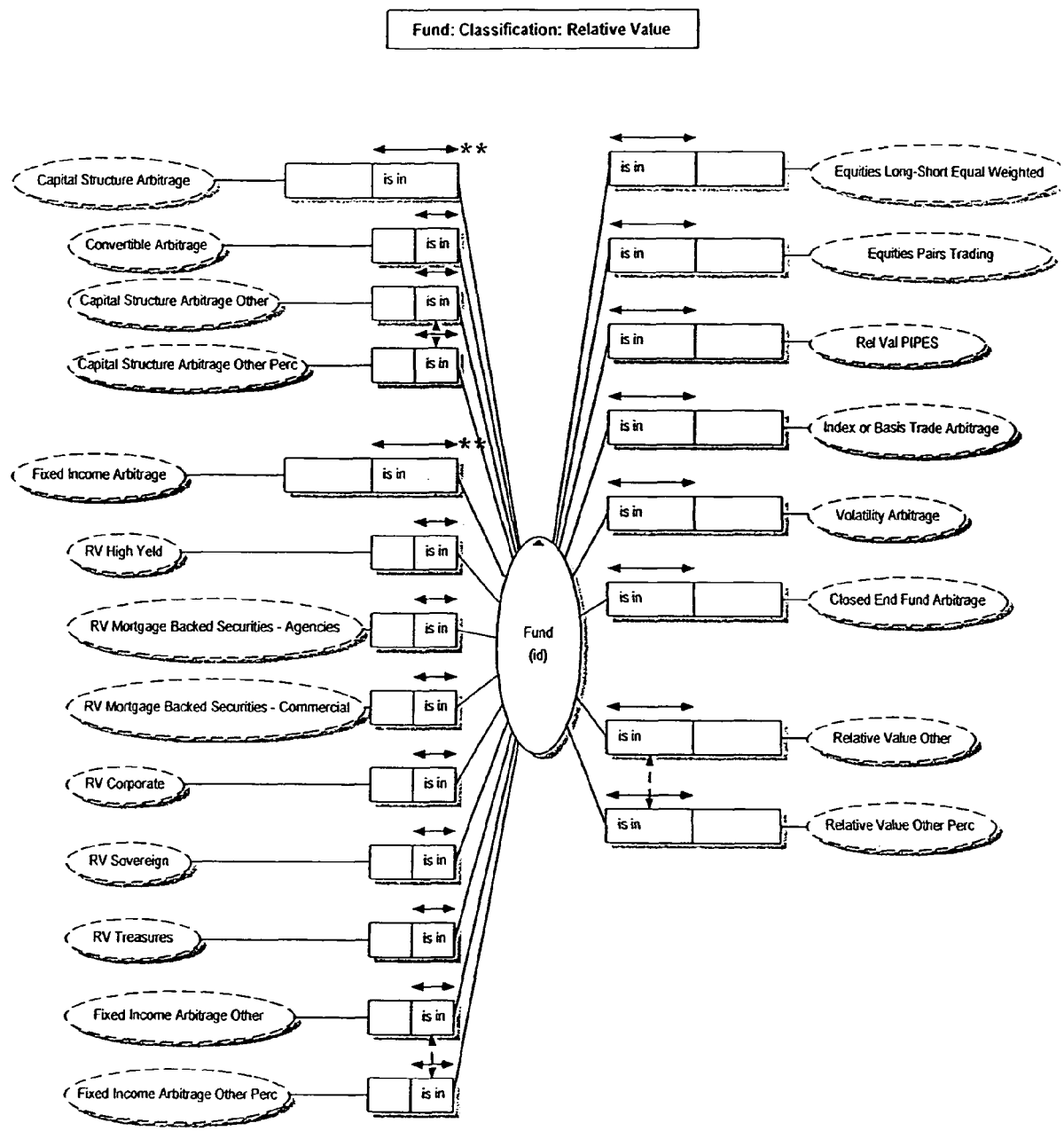
Figure 17:
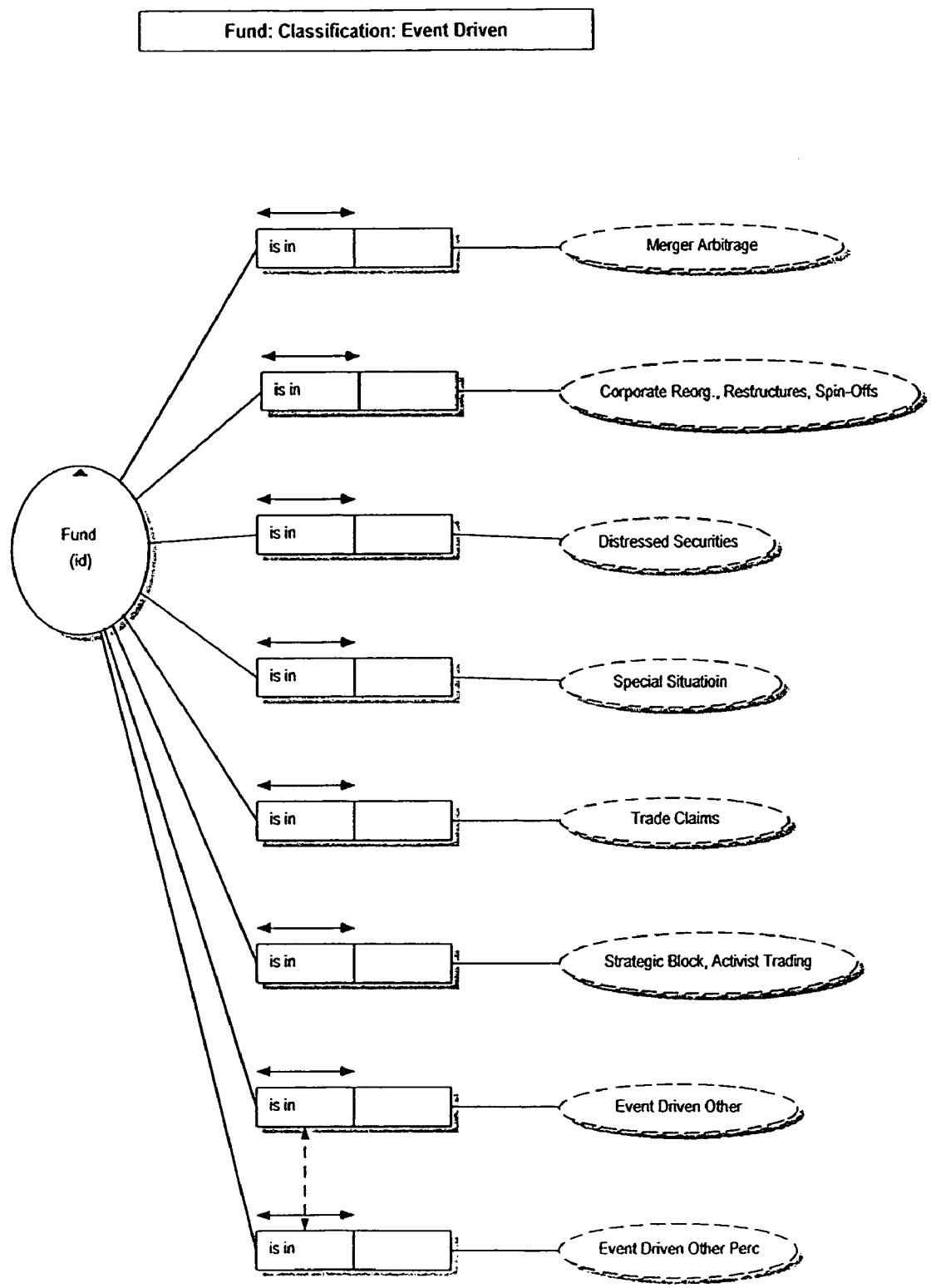
Figure 18:
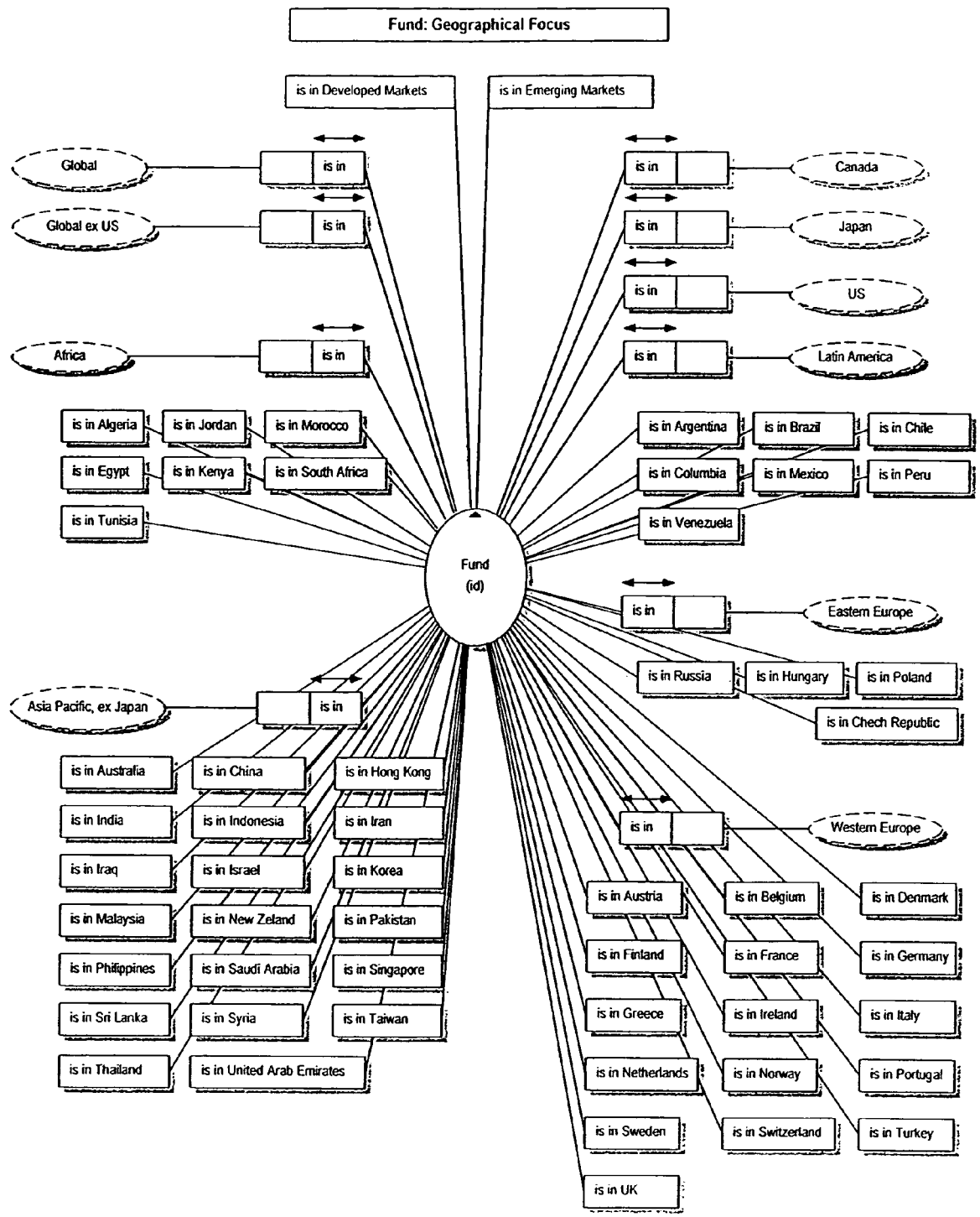
Figure 19:
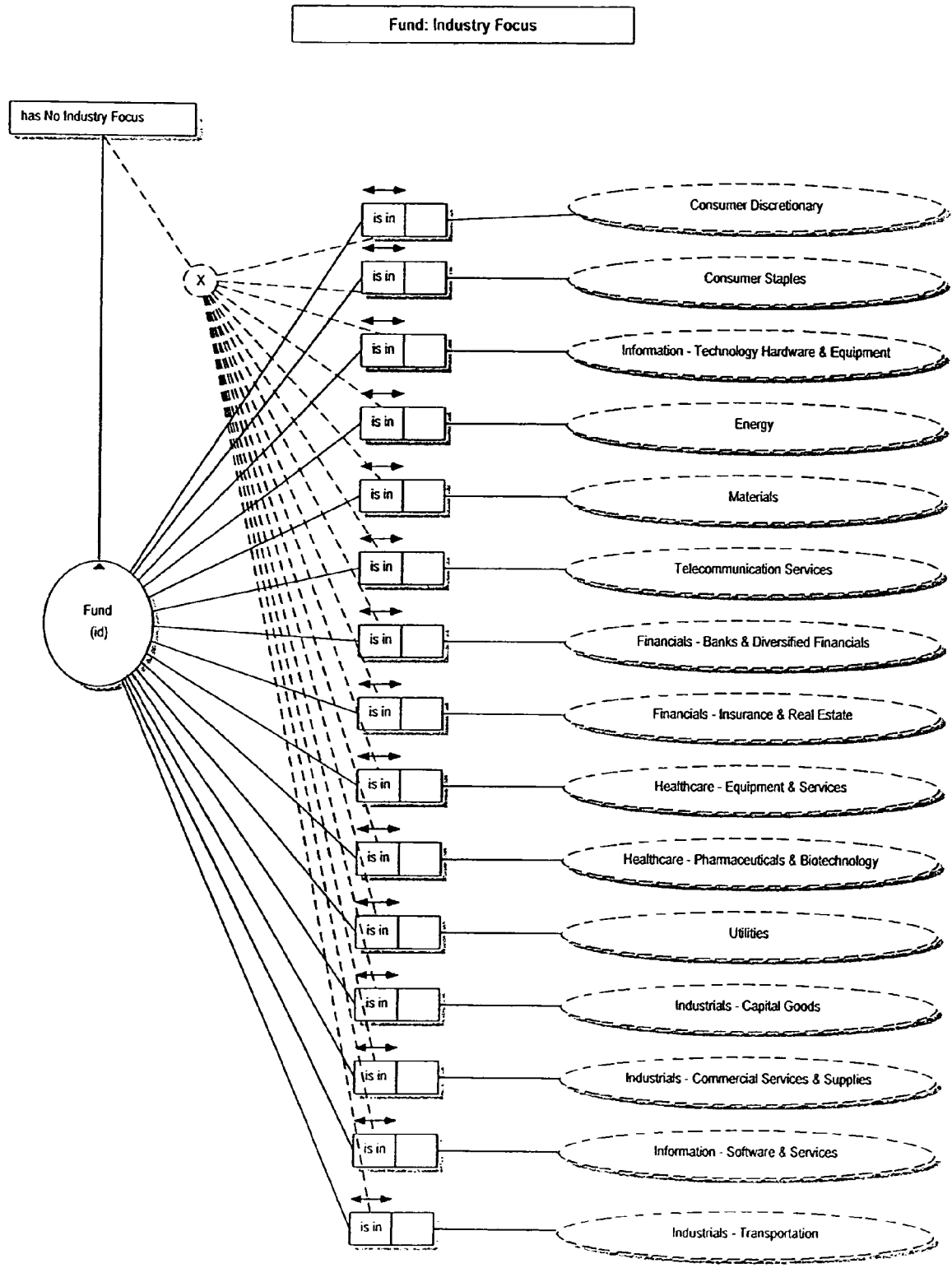
Figure 20:
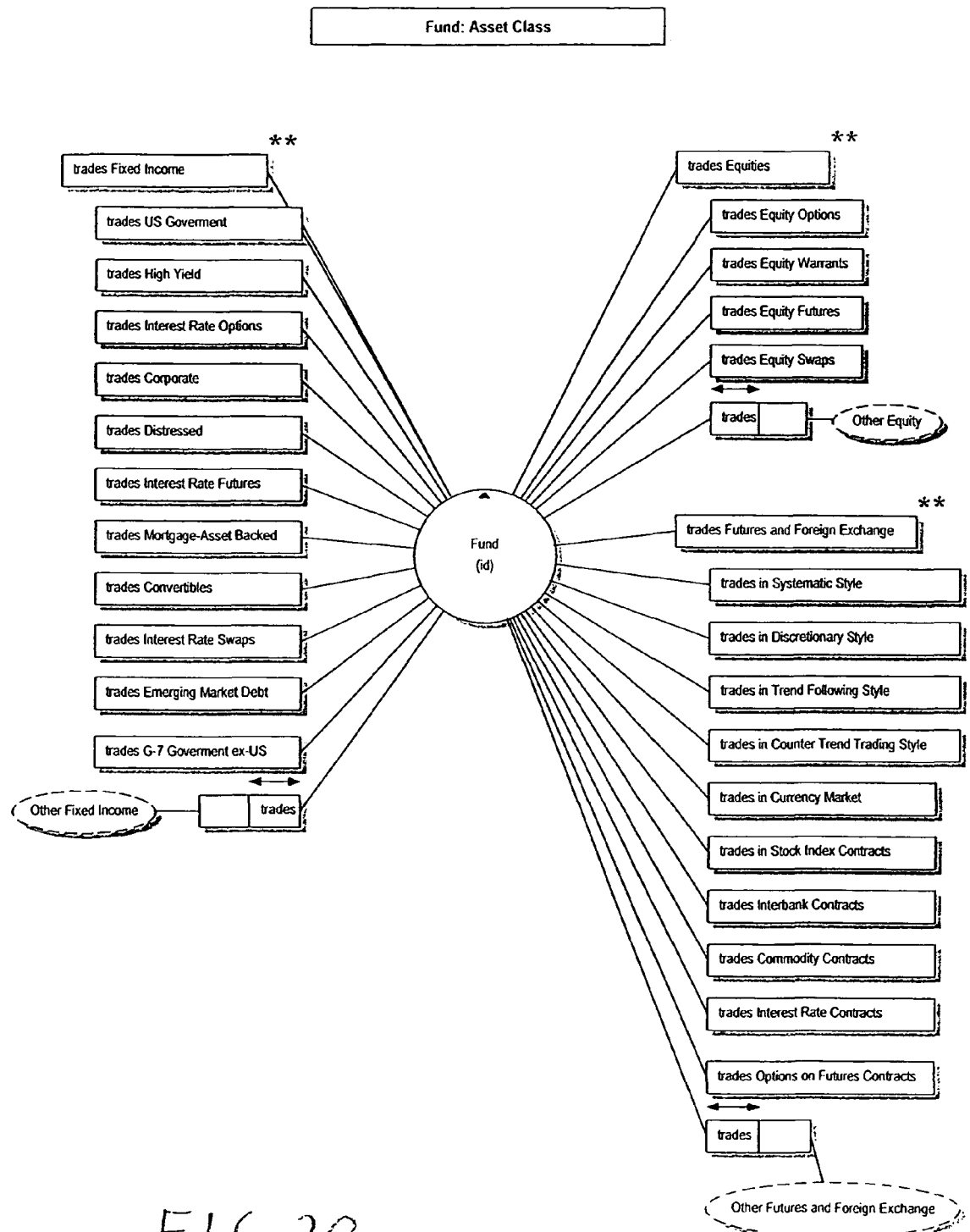
Figure 21:
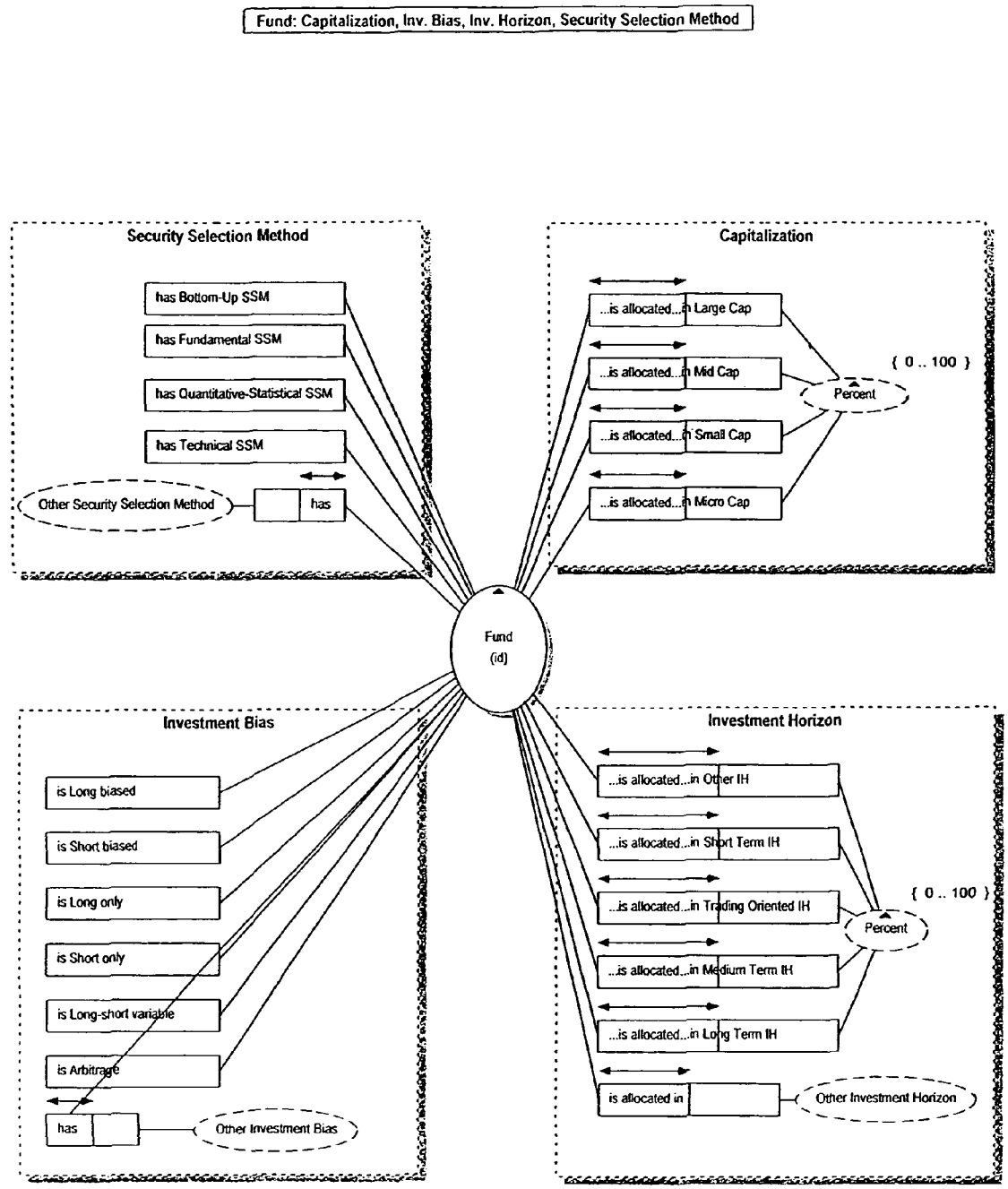
Figure 22:
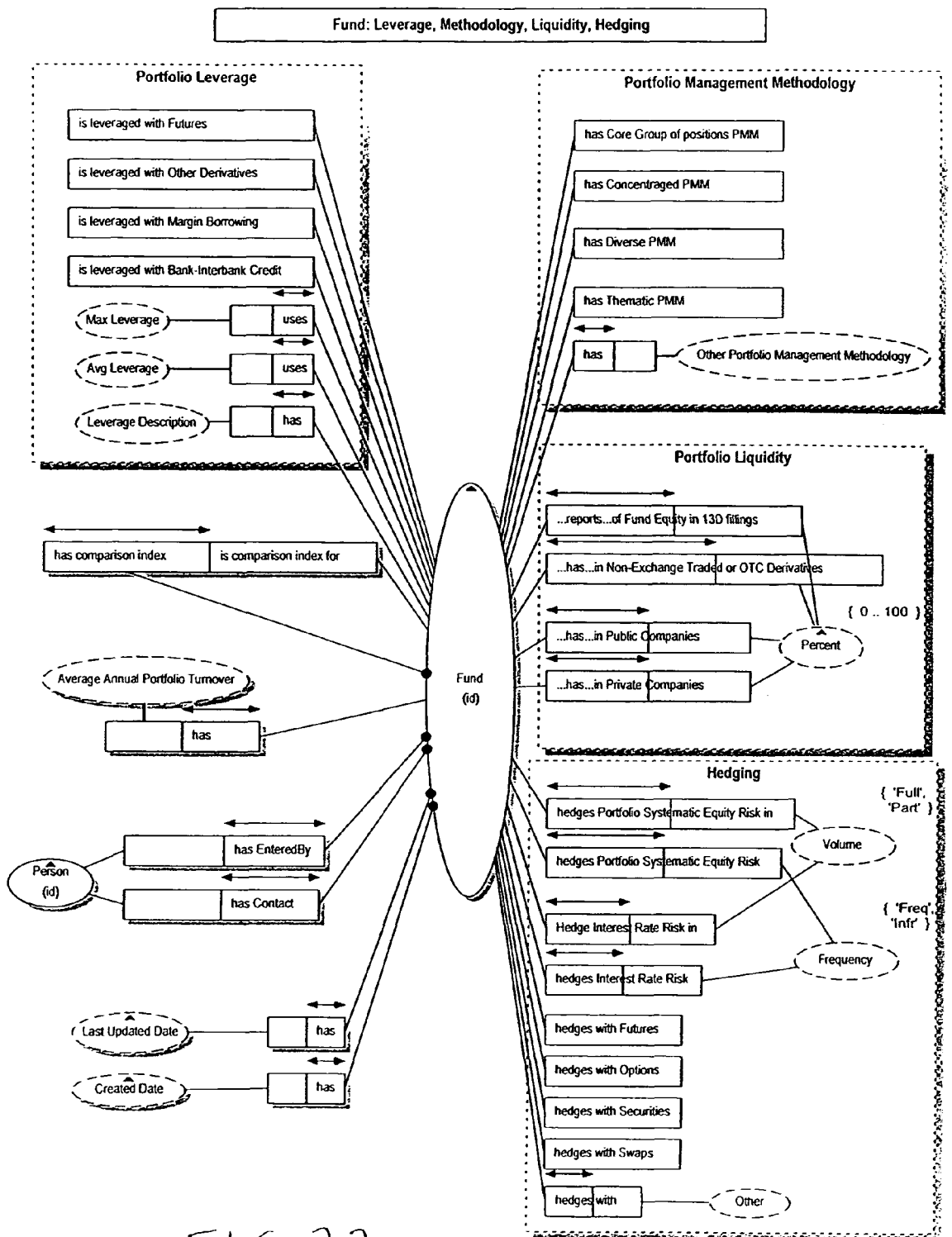

FIGS. 13-22 depict additional ORM diagrams for "Fund." Each diagram is directed to a different fund aspect. The diagram in FIG. 13 is directed to fund staffing (for example, prime broker, auditor, legal counsel, marketing, and offshore administrator). The diagram in FIG. 14 is directed to fund fees and terms. The diagram in FIG. 15 is directed to fund classification (directional). The diagram in FIG. 16 is directed to fund classification (relative value). The diagram in FIG. 17 is directed to fund classification (event driven). The diagram in FIG. 18 is directed to fund geographical focus. The diagram in FIG. 19 is directed to fund industry focus. The diagram in FIG. 20 is directed to fund asset class. The diagram in FIG. 21 is directed to fund capitalization, security selection method, investment bias, and investment horizon. The diagram in FIG. 22 is directed to fund portfolio leverage, portfolio management methodology, portfolio liquidity, and hedging strategies.

Figure 23:
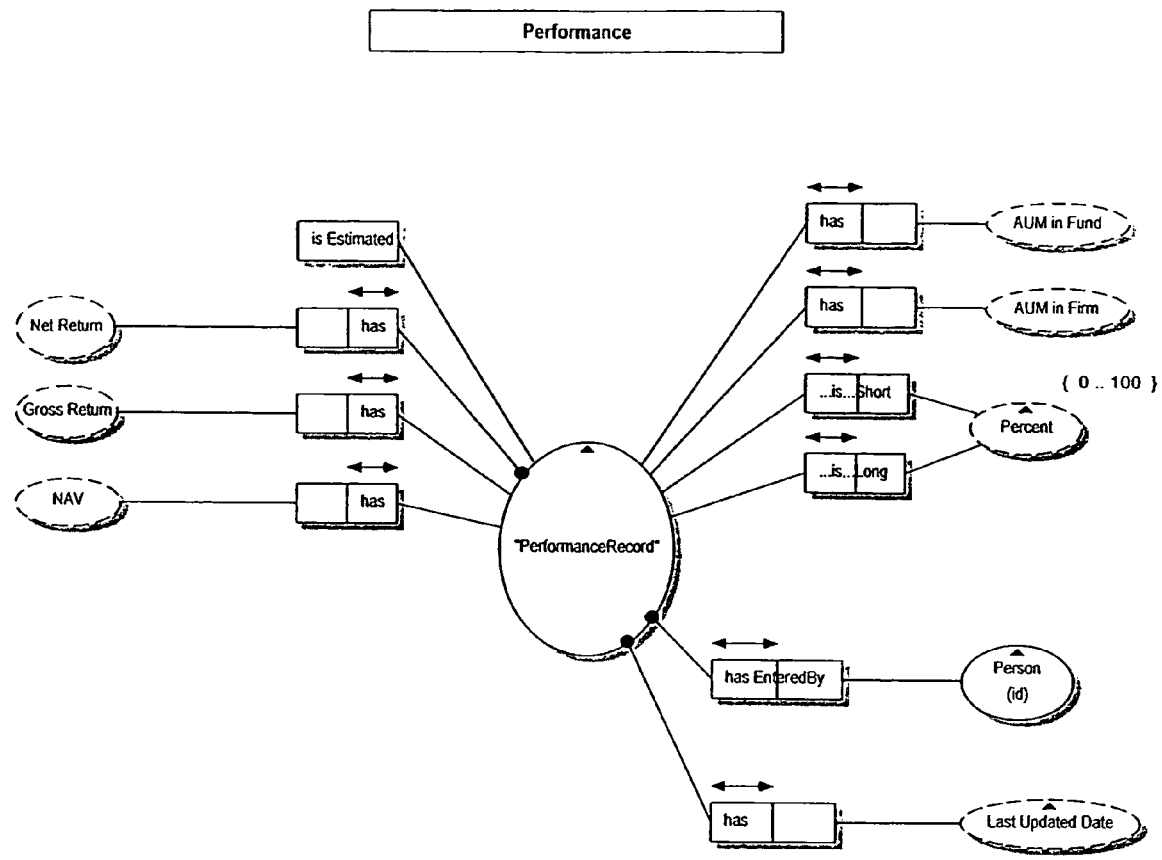
FIG. 23 is an ORM diagram directed to performance records.

FIG. 23 is an ORM diagram directed to performance records.

Figure 24:
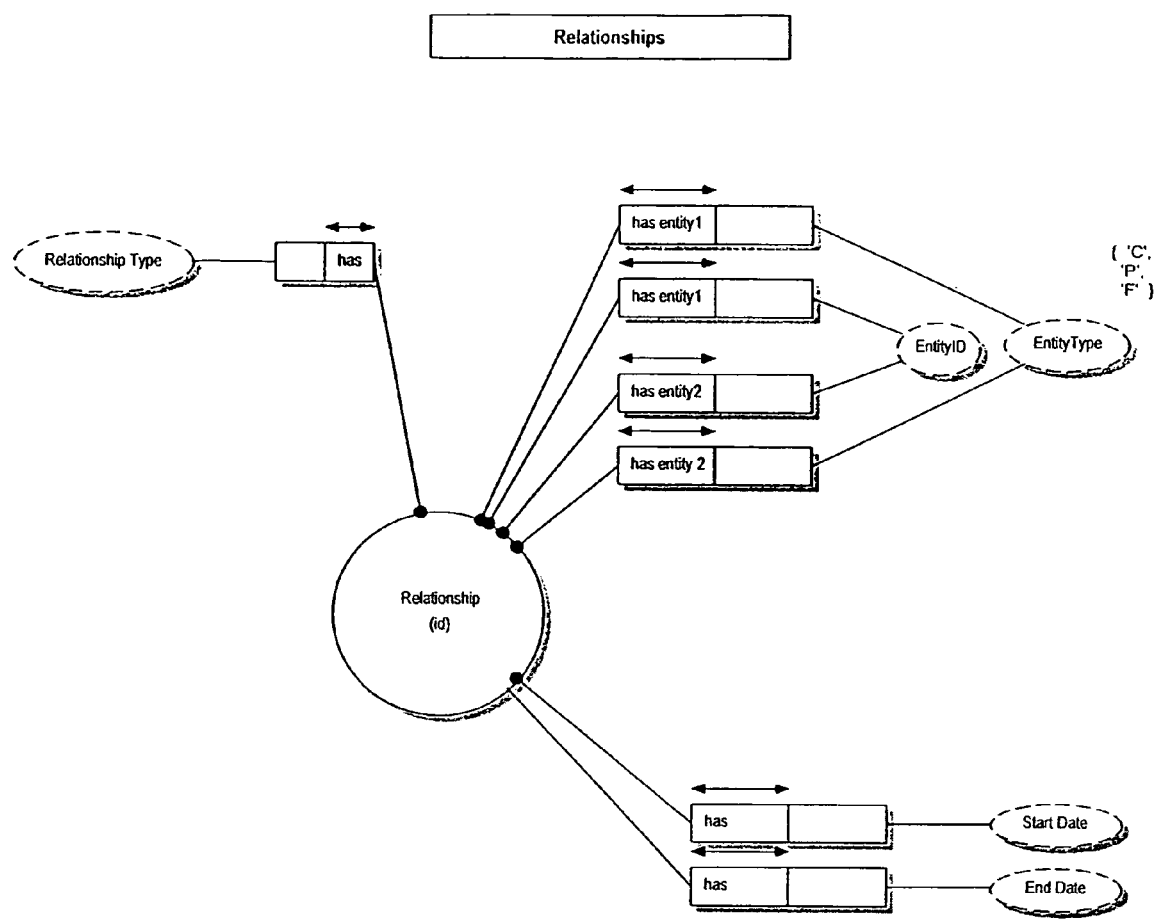
FIG. 24 is an ORM diagram directed to relationships.

FIG. 24 is an ORM diagram directed to relationships.

Figure 25:
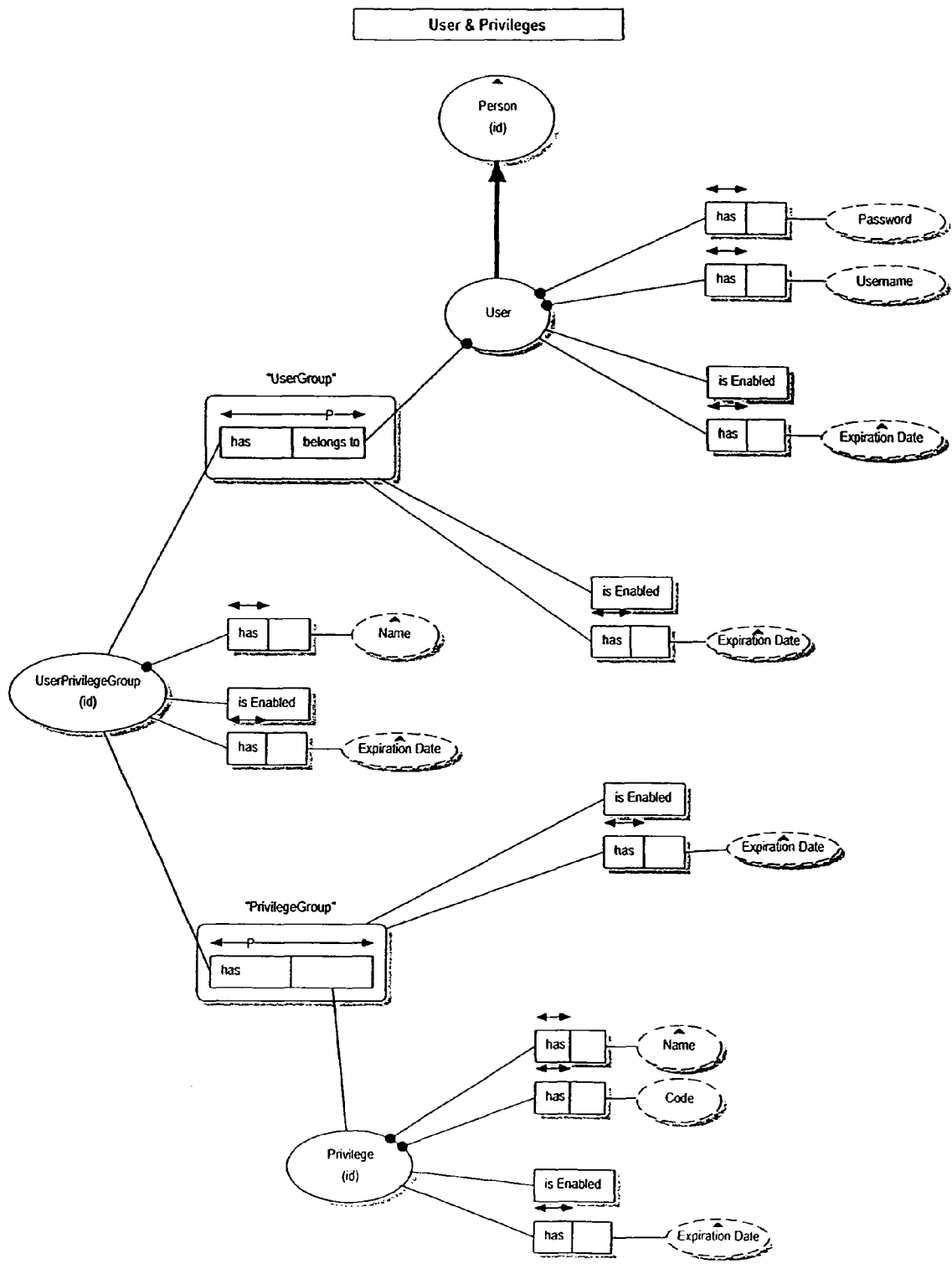
FIG. 25 is an ORM diagram directed to user privileges.

FIG. 25 is an ORM diagram directed to user privileges.

Figure 26:
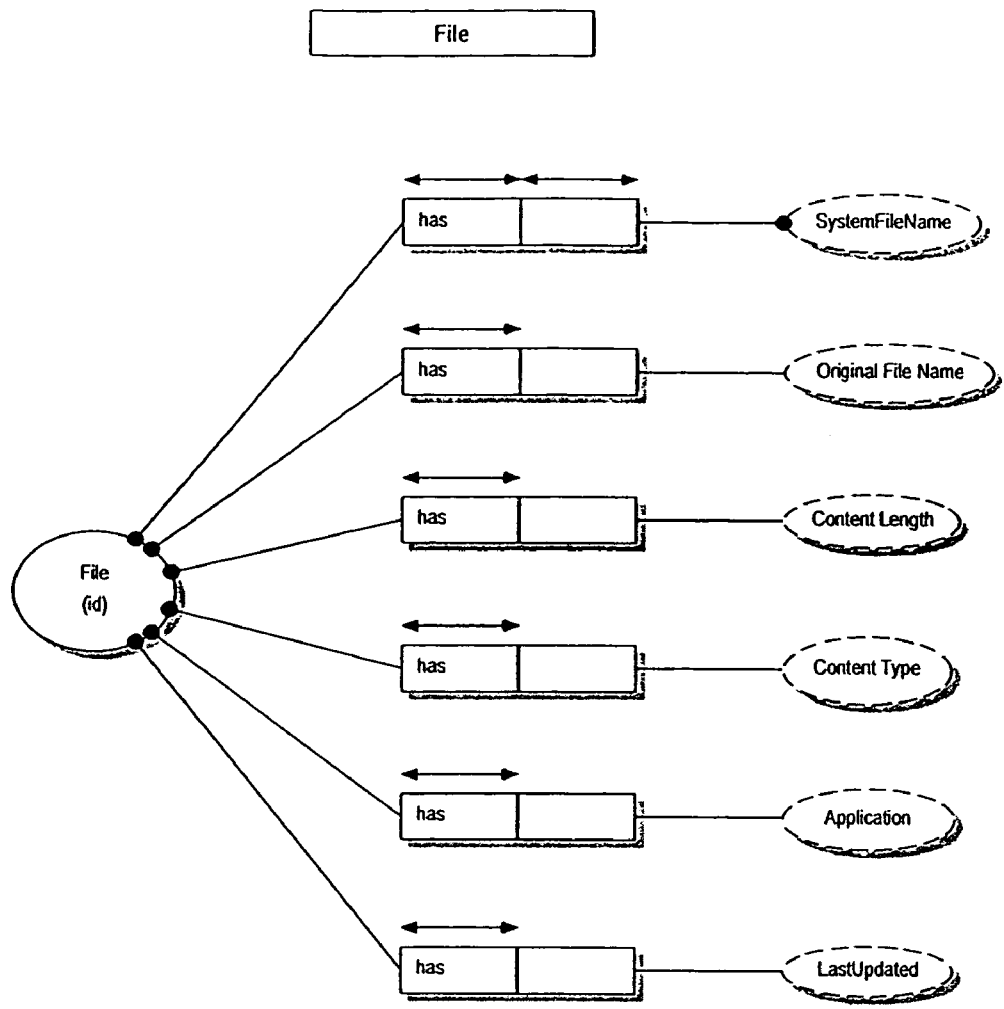
FIG. 26 is an ORM diagram directed to files.

FIG. 26 is an ORM diagram directed to files. "File" is used to store and retrieve Files uploaded to the system. "System File Name" is a randomly-generated extension-less name that is used to store the file on the system. All files could be stored in the same folder, or in different folders. If stored in different folders, the folder name could be stored in the System File Name or the folder could be looked up based on the "Application."

Thus, a preferred system embodiment of the present invention comprises a database storing potential funds for an index of funds of hedge funds and a central processing unit in communication with the database, the processing unit operative to: (1) identify which of the potential funds meet specific criteria selected so as to minimize biases comprising selection bias and survivorship bias; (2) create an index by indexing funds identified as meeting the criteria; (3) construct a portfolio of funds in the index; and (4) allocate capital to funds in the portfolio.

Although the present invention has been described with reference to preferred embodiments, numerous modifications and variations can be made that will still be within the scope of the invention. No limitation with respect to the specific embodiments disclosed herein other than indicated by the appended claims is intended or should be inferred.

What is claimed is:

1. A method, comprising:
   identifying, by a computing device, potential funds of hedge funds for an index of funds of hedge funds from at least one data store;
   identifying, by the computing device, which of the potential funds of hedge funds from the at least one data store meet at least one specific criterion to minimize at least one of selection bias or survivorship bias;
   creating, by the computing device, the index by indexing funds of hedge funds identified as meeting the at least one specific criterion;
   constructing, by the computing device, a portfolio of the funds of hedge funds in the index; and
   allocating, by the computing device, capital to the funds of hedge funds in the portfolio.

2. The method of claim 1, wherein the identifying of which of the potential funds of hedge funds meet the at least one specific criterion includes identifying the funds of hedge funds from the potential funds of hedge funds that minimize selection bias.

3. The method of claim 1, wherein the identifying of which of the potential funds of hedge funds meet the at least one specific criterion includes identifying the funds of hedge funds from the potential funds of hedge funds that minimize survivorship bias.

4. The method of claim 1, wherein the identifying the potential funds of hedge funds for the index of funds of hedge funds from at least one data store includes searching available commercial databases.

5. The method of claim 1, wherein the identifying of which of the potential funds of hedge funds meet the at least one specific criterion includes identifying the funds of hedge funds from the potential funds of hedge funds that meet a fund size.

6. The method of claim 1, wherein the identifying of which of the potential funds of hedge funds meet the at least one specific criterion includes identifying the funds of hedge funds from the potential funds of hedge funds that meet a fund diversification.

7. The method of claim 1, wherein the identifying of which of the potential funds of hedge funds meet the at least one specific criterion includes identifying the funds of hedge funds from the potential funds of hedge funds that meet a fund track record.

8. The method of claim 1, wherein the identifying of which of the potential funds of hedge funds meet the at least one specific criterion includes identifying the funds of hedge funds from the potential funds of hedge funds that charge fees within one standard deviation of an average of the potential funds of hedge funds.

9. The method of claim 1, wherein the identifying of which of the potential funds of hedge funds meet the at least one specific criterion includes identifying the funds of hedge funds from the potential funds of hedge funds that meet a length of fund history.

10. The method of claim 1, wherein the identifying of which of the potential funds of hedge funds meet the at least one specific criterion includes identifying the funds of hedge funds from the potential funds of hedge funds that meet a concentration criterion.

11. The method of claim 1, wherein the identifying of which of the potential funds of hedge funds meet the at least one specific criterion includes identifying the funds of hedge funds from the potential funds of hedge funds that resemble a fund or group of funds to a closed fund.

12. The method of claim 1, wherein the allocating of capital to the funds of hedge funds in the portfolio includes allocating capital to the funds of hedge funds equally across the funds of hedge funds.

13. The method of claim 1, wherein the allocating of capital to the funds of hedge funds in the portfolio includes allocating capital to the funds of hedge funds according to fund size.

14. The method of claim 1, further comprising rebalancing, by the computing device, the portfolio at least in part by removing a subset of the funds of the hedge funds that no longer meet the at least one specific criterion.

15. The method of claim 1, further comprising negotiating, by the computing device, fee discounts to maintain fees for the portfolio at a level of investing in a fund of hedge funds.

16. The method of claim 1, further comprising storing, by the computing device, data regarding the potential funds of hedge funds in a database according to object role modeling.

17. A non-transitory computer-readable medium having computer-executable instructions stored thereon, wherein the computer-executable instructions in response to execution by a computing device cause the computing device to perform operations, comprising:
   identifying potential funds of hedge funds for an index of funds of hedge funds;
   identifying which of the potential funds of hedge funds meet specific criteria selected so as to minimize biases comprising selection bias and survivorship bias;
   creating the index by indexing funds of hedge funds identified as meeting the specific criteria;
   constructing a portfolio of the funds of hedge funds in the index; and allocating capital to the funds of hedge funds in the portfolio.

18. The computer-readable medium of claim 17, wherein the potential funds of hedge funds are identified by searching available commercial databases.

19. The computer-readable medium of claim 17, wherein the specific criteria comprise fund size.

20. The computer-readable medium of claim 17, wherein the specific criteria comprise fund diversification.

21. The computer-readable medium of claim 17, wherein the specific criteria comprise fund track record.

22. The computer-readable medium of claim 17, wherein the specific criteria comprise a function of fees charged.

23. The computer-readable medium of claim 17, wherein the specific criteria comprise length of fund history.

24. The computer-readable medium of claim 17, wherein the specific criteria comprise concentration criteria.

25. The computer-readable medium of claim 17, wherein the specific criteria comprise resemblance of a fund or group of funds to a closed fund.

26. The computer-readable medium of claim 17, wherein capital is allocated to funds equally across funds.

27. The computer-readable medium of claim 17, wherein capital is allocated to funds according to fund size.

28. The computer-readable medium of claim 17, wherein the computer-executable instructions in response to execution by the computing device further cause the computing device to perform operations comprising rebalancing the portfolio at least in part by shifting capital within the portfolio.

29. The computer-readable medium of claim 17, wherein the computer-executable instructions in response to execution by the computing device further cause the computing device to perform operations comprising negotiating fee discounts to maintain fees for the portfolio at a level of investing in a fund of hedge funds.

30. The computer-readable medium of claim 17, wherein the computer-executable instructions in response to execution by the computing device further cause the computing device to perform operations comprising storing data regarding the potential funds of hedge funds in a database according to object role modeling.

31. A system, comprising:
a database populated with potential funds of hedge funds for an index of funds of hedge funds; and
a processor linked to the database and configured to:
access the database and identify one or more of the potential funds of hedge funds that minimize at least one of selection bias or survivorship bias;
create the index including the one or more of the potential funds of hedge funds;
construct a portfolio of funds of hedge funds in the index; and allocate capital to the portfolio.

32. A method, comprising:
determining, by a computing device, a set of funds of hedge funds from a superset of funds of hedge funds based on at least one bias function represented by bias function data;
forming, by the computing device, index data representative of an index based on the set of funds of hedge funds;
generating, by the computing device, portfolio data representing a portfolio of funds of hedge funds corresponding to the index represented by the index data; and
capitalizing, by the computing device, the portfolio represented by the portfolio data from at least one capital source.

33. The method of claim 1, further comprising monitoring, by the computing device, the at least one data store or a disparate data store to identify one or more new funds of hedge funds that meet the at least one specific criterion for inclusion in the portfolio.

34. A method, comprising:
identifying, by a computing device, potential funds of hedge funds for an index of funds of hedge funds from at least one data store;
identifying, by the computing device, a first subset of the potential funds of hedge funds from the at least one data store that meet at least one criterion to reduce at least one of selection bias or survivorship bias; and
generating, by the computing device, the index by indexing the first subset of the potential funds of hedge funds identified as meeting the at least one criterion.

35. The method of claim 34, further comprising:
forming, by the computing device, a portfolio of the first subset of the potential funds of hedge funds in the index.

36. The method of claim 35, wherein the identifying of the potential funds of hedge funds includes identifying, from at least one external data store other than the at least one data store, one or more new funds of hedge funds that meet the at least one criterion for inclusion in the portfolio.

37. The method of claim 35, further comprising:
allocating, by the computing device, capital to the first subset of the potential funds of hedge funds in the portfolio.

38. The method of claim 37, wherein the allocating includes allocating capital to the first subset of the potential funds of hedge funds equally across the first subset of the potential funds of hedge funds.

39. The method of claim 37, wherein the allocating includes allocating capital to the first subset of the potential funds of hedge funds according to fund size.

40. The method of claim 34, wherein the identifying the first subset of the potential funds of hedge funds includes at least one of identifying which of the potential funds of hedge funds meet a fund size, identifying which of the potential funds of hedge funds meet a fund diversification, identifying which of the potential funds of hedge funds meet a fund performance metric, identifying which of the potential funds of hedge funds charge fees within a predefined statistical deviation of the potential funds of hedge funds, identifying which of the potential funds of hedge funds meet a fund age, identifying which of the potential funds of hedge funds meet a concentration criterion, or identifying which of the potential funds of hedge funds are similar or substantially similar to a closed fund or group of closed funds.

41. The method of claim 34, further comprising:
rebalancing, by the computing device, the portfolio at least in part by removing a second subset of the potential funds of hedge funds that no longer meet the at least one criterion.

42. The method of claim 34, further comprising:
negotiating, by the computing device, fee discounts to maintain fees for the portfolio at a level of investing in a fund of hedge funds.

43. A non-transitory computer-readable medium having computer-executable instructions stored thereon, wherein the computer-executable instructions, in response to execution by a computing device, cause the computing device to perform operations, comprising:
identifying potential funds of hedge funds for an index of funds of hedge funds;
identifying which of the potential funds of hedge funds meet criteria selected so as to decrease biases comprising selection bias and survivorship bias; and
creating the index by indexing funds of hedge funds of the potential funds of hedge funds identified as meeting the criteria.

44. The non-transitory computer-readable medium of claim 43, wherein the identifying of the potential funds of hedge funds includes searching available commercial databases.

45. The non-transitory computer-readable medium of claim 43, wherein the identifying which of the potential funds of hedge funds meet the criteria comprises identifying which of the potential funds of hedge funds meet at least one of a fund size criterion, a fund diversification criterion, a fund track record, a criterion based on a function of fees charged, a length of fund history, a concentration criterion, or a similarity to at least one closed fund.

46. The non-transitory computer-readable medium of claim 43, wherein the computer-executable instructions, in response to execution by a computing device, further cause the computing device to perform operations, comprising:
constructing a portfolio of the funds of hedge funds in the index.

47. The non-transitory computer-readable medium of claim 46, wherein the computer-executable instructions, in response to execution by a computing device, further cause the computing device to perform operations, comprising:
allocating capital to the funds of hedge funds in the portfolio.

48. The non-transitory computer-readable medium of claim 47, wherein the allocating includes allocating the capital to the funds of hedge funds in the portfolio according to fund size.

49. The non-transitory computer-readable medium of claim 47, wherein the computer-executable instructions, in response to execution by the computing device, further cause the computing device to perform operations, comprising:
    rebalancing the portfolio at least in part by shifting capital within the portfolio.

50. The non-transitory computer-readable medium of claim 43, wherein the computer-executable instructions, in response to execution by the computing device, further cause the computing device to perform operations, comprising:
    negotiating fee discounts to maintain fees for the portfolio at a level of investing in a fund of hedge funds.

51. An apparatus, comprising:
    at least one data store;
    a processor linked to the at least one data store and configured to:
        identify potential funds of hedge funds for an index of funds of hedge funds from at least one data store;
        identify which of the potential funds of hedge funds meet at least one criterion to reduce at least one of selection bias or survivorship bias; and
        create the index by indexing funds of hedge funds identified as meeting the at least one criterion.

\* \* \* \* \*

UNITED STATES PATENT AND TRADEMARK OFFICE
CERTIFICATE OF CORRECTION

| | | |
|---|---|---|
| PATENT NO. | : 8,055,565 B2 | |
| APPLICATION NO. | : 11/447756 | |
| DATED | : November 8, 2011 | |
| INVENTOR(S) | : Tarrant | |

It is certified that error appears in the above-identified patent and that said Letters Patent is hereby corrected as shown below:

Title page, item (56), under "Other Publications", in Column 2, Line 1, delete "David a. Hsieh." and insert -- David A. Hsieh. --.

Signed and Sealed this
Twenty-sixth Day of June, 2012

David J. Kappos
*Director of the United States Patent and Trademark Office*